(12) United States Patent
Pryadkin et al.

(10) Patent No.: US 8,063,383 B2
(45) Date of Patent: Nov. 22, 2011

(54) INERTIAL POSITIONER AND AN OPTICAL INSTRUMENT FOR PRECISE POSITIONING

(76) Inventors: Sergiy Pryadkin, Troy, MI (US); Dmitri Simonian, Sunnyvale, CA (US)

( * ) Notice: Subject to any disclaimer, the term of this patent is extended or adjusted under 35 U.S.C. 154(b) by 376 days.

(21) Appl. No.: 12/264,268

(22) Filed: Nov. 4, 2008

(65) Prior Publication Data

US 2010/0115671 A1 May 6, 2010

(51) Int. Cl.
*G01N 23/00* (2006.01)
*G21K 7/00* (2006.01)
(52) U.S. Cl. .......... 250/442.11; 250/440.11; 850/1; 850/2; 850/3; 850/52; 850/53
(58) Field of Classification Search .......... 250/440.11, 250/442.11; 850/1, 2, 3, 52, 53
See application file for complete search history.

(56) References Cited

U.S. PATENT DOCUMENTS

| | | | | |
|---|---|---|---|---|
| 5,360,974 A * | 11/1994 | Hammond et al. | ...... | 250/442.11 |
| 5,450,989 A * | 9/1995 | Gilroy | ...... | 222/402.24 |
| 5,455,420 A * | 10/1995 | Ho et al. | ...... | 850/1 |
| 5,510,615 A * | 4/1996 | Ho et al. | ...... | 850/9 |
| 5,530,253 A * | 6/1996 | Nishioka et al. | ...... | 250/442.11 |
| 5,675,154 A * | 10/1997 | Lindsay et al. | ...... | 250/442.11 |
| 5,760,396 A * | 6/1998 | Lindsay et al. | ...... | 850/1 |
| 6,278,113 B1 * | 8/2001 | Murayama et al. | ...... | 850/3 |
| 6,323,483 B1 * | 11/2001 | Cleveland et al. | ...... | 850/7 |
| 6,337,484 B1 * | 1/2002 | Loopstra et al. | ...... | 250/442.11 |
| 7,232,688 B2 * | 6/2007 | Little et al. | ...... | 436/173 |
| 7,278,298 B2 * | 10/2007 | Hansma et al. | ...... | 73/105 |
| 7,589,823 B2 * | 9/2009 | Shibazaki | ...... | 355/72 |
| 7,784,107 B2 * | 8/2010 | Kley | ...... | 850/4 |
| 7,791,796 B2 * | 9/2010 | Ue et al. | ...... | 359/393 |
| 7,884,326 B2 * | 2/2011 | van de Water et al. | ...... | 250/311 |
| 2008/0121813 A1 * | 5/2008 | Young | ...... | 250/442.11 |

* cited by examiner

*Primary Examiner* — David A Vanore
(74) *Attorney, Agent, or Firm* — Young Basile Hanlon & MacFarlane PC

(57) ABSTRACT

We disclose a precision positioner based on an inertial actuator, an optical instrument for accurate positional readout and control, and an electrostatically clamped assembly for holding any instrument or device. All aspects of the present invention present a significant improvement over the prior art: a positioner is robust and compact; an optical instrument for positional control is a profoundly simple and compact module; a clamping assembly is self-aligning and suitable for robotic hot-swapping of objects being positioned.

31 Claims, 27 Drawing Sheets

INERTIAL POSITIONER AND AN OPTICAL INSTRUMENT FOR PRECISE POSITIONING

FIELD OF THE INVENTION

The invention related to the field of high-precision positioning. More specifically, this invention relates to the field of piezo-driven inertial positioners. Another aspect of this invention relates to field of accurate determination of position by the principle of light interference and position-sensing light detectors. Another aspect of this invention relates to positioners integrated with optical instruments for the purpose of accurate control of position and motion.

BACKGROUND OF THE INVENTION

High-precision positioner is an enabling component of many scientific and industrial instruments. Such instruments are widely used in a variety of fields, for example, in optical microscopy and spectroscopy, electron microscopy, scanning probe microscopy, nanotechnology, wafer inspection, microassembly, optical fiber alignment methods in optoelectronics, and many others.

A design of one known type of such positioner is disclosed in the 1993 World Intellectual Property Organization Publication WO/1993/019494 by Shuheng Pan. Described therein is a piezoelectric step positioner. This positioner comprises six shear-piezo actuators that hold a movable element. Motion can be achieved in two different ways: by slip-stick actuation or by locomotion. Different arrangements effecting linear, x-y planar, and rotational motion are described. This device is reliable, rigid, and capable of performing in many environments. However, when used for the design of a multi-axis positioner, this invention lacks optimal implementation of several necessary functions, as follows. The embodiment of the invention that comprises a stack of two or three independent single-axis positioners lacks compactness which limits the rigidity, and thus the performance of the instrument. Another embodiment of Pan's invention provides simultaneous motion in two dimensions, but such motion is not independent along Cartesian axes and makes the readout of coordinates difficult.

Another type of positioner relevant to our invention is described in the U.S. Pat. No. 5,912,527 by Karrai. This positioner is arranged in such a way that a movable member is set in motion by a stick-slip mechanism, the driving motor of which is the extending and contracting piezo-stack. The preferred embodiment of this invention allows a compact multi-axis positioning assembly, but such assembly is not rigid enough for many applications, for example, its low mechanical resonant frequency limits its use in scanning probe microscopy. This invention does not teach a method of measuring coordinates of a movable member.

In U.S. Pat. No. 6,130,427 Park et al. disclose an optical setup for measuring xyz coordinates of a movable cartridge carrying a scanning microscope probe. The cartridge is affixed to the top of a piezoelectric tube having multiple electrodes Application of appropriate voltages across the electrodes, produces displacement in the plane of the top surface (xy) and along the axis of the tube (z). In this prior art, displacements x and y of the cartridge are measured by the spot where a probing beam of light impinges on a 4-quadrant photodetector positioned in the xy plane. Axial displacement z is measured separately requiring two additional bi-cell photodetectors positioned along z axis, and two additional probing beams of light. The resulting setup is quite complex and difficult to manufacture, as it requires a complicated alignment. An alternative instrument that reads all three coordinates while requiring a single beam of light and a single detector affixed to the movable element would be a clear advantage over this prior art.

Therefore, there is a need for an improved three-dimensional positioning instrument integrated with a reliable instrument for accurate determination of coordinates: compact and rigid, applicable to a variety of uses, cost-efficient, and straightforward to machine and assemble. Sufficient rigidity is necessary for achieving mechanical resonant frequency on the order of 10 kHz or higher, which will make the instrument ideally suited for probe microscopy, micro-manipulation and nano-lithography. For example, such instrument will enable scanning probe microscopy with atomic resolution in a real-world environment, where mechanical vibrations are not entirely suppressed.

SUMMARY OF THE INVENTION

We invented an instrument for precise positioning of objects using an inertial actuator and an optical instrument for accurate determination of the object position in 3 dimensions. The micro-positioner is compact and rigid with the lowest mechanical resonant frequency in excess of 10 kHz. The optical instrument for position readout and control is a compact interferometric module comprising a position-sensing detector as one of the arms of the interferometer. A single incident beam of light is required for position readout in 3 dimensions in all disclosed embodiments of the instrument. We further invented a mounting assembly suitable for carrying and swapping a microdevice or a sample by a disclosed positioner or another instrument.

DETAILED DESCRIPTION OF PREFERRED EMBODIMENTS

We now turn to the detailed description of this invention.

I. An Inertial Positioner

Figure 1A:
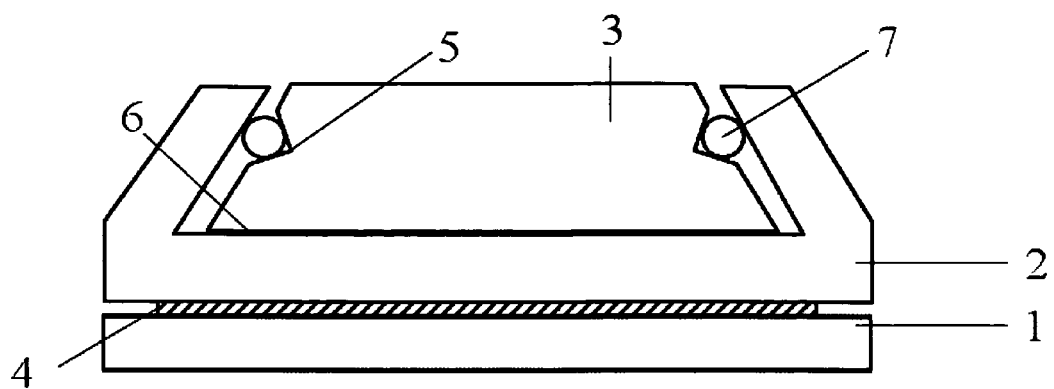
FIG. 1a. A schematic representation of an inertial single-axis positioner in which roller containing surfaces comprise a guiding groove disposed in the moving platform. In this embodiment the carrier clamps the platform to ensure the loaded frictional contact between sliding surfaces FIG. 1b. A schematic representation of an inertial single-axis positioner in which roller containing surfaces comprise a guiding groove disposed in the carrier. In this alternative embodiment the carrier clamps the platform to ensure the loaded frictional contact between sliding surfaces FIG. 1c. A schematic representation of an inertial single-axis positioner in which roller containing surfaces comprise a guiding groove disposed in the platform, and in which the base clamps the platform to ensure the loaded frictional contact between sliding surfaces FIG. 1d. A schematic representation of an inertial single-axis positioner in which roller containing surfaces comprise a guiding groove disposed in the base. In this alternative embodiment the base clamps the platform to ensure the loaded frictional contact between sliding surfaces FIG. 1e. A schematic representation of an inertial single-axis positioner in which a moving mechanism is a plurality of piezoelectric stacks FIG. 1f. A schematic representation of an inertial single-axis positioner in which a moving mechanism is a plurality of piezoelectric stacks and the frictional engagement is between the platform and a plurality of carriers FIG. 1g. A schematic representation of an inertial single-axis positioner in which a moving mechanism is a plurality of piezoelectric stacks and the frictional engagement is between the platform and a plurality of surfaces of piezoelectric stacks FIG. 1h. A schematic representation of an inertial single-axis positioner in which roller containing surfaces are formed in the platform and in the base FIG. 1j. A schematic representation of an inertial single-axis positioner in which cylinders are used as rollers housed in groves formed in a carrier of a single-axis positioner FIG. 1k. A schematic representation of an inertial single-axis positioner in which balls are housed between surfaces of the base and the platform.

In FIG. 1a through FIG. 4a series of embodiments of a single-axis inertial positioner is presented. Turning to FIG. 1a, the represented positioner is an essentially rigid construction comprising a frame having as frame elements: a base 1, a carrier 2, and an inertial actuator 4 which is disposed on base 1 of the positioner; further comprising a movable platform 3 to which an object to be positioned is affixed. Base 1 may be a platform of another positioner, or any other suitable rigid object. One surface of the actuator is bonded to the base, while the other surface is bonded to the carrying element. In this invention, a preferred embodiment of an inertial actuator 4 is a piezo-electric actuator, more preferably a stack of piezo-electric elements. Less preferred embodiments of an inertial positioner comprise a magnetostrictive or an electromagnetic actuator.

Figure 7:
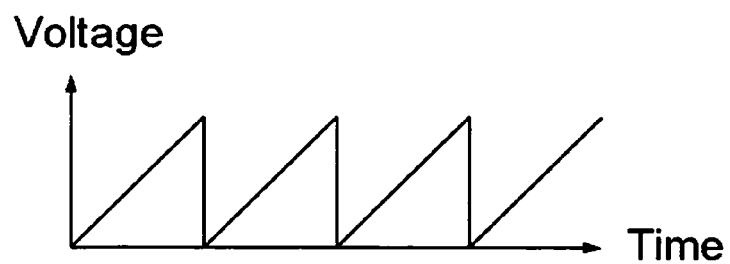

The piezo-electric actuator 4 is supplied with electrical contacts so as to apply voltage causing sheer stress to the actuator. The waveform of applied voltage is chosen in such a way as to move the carrier 2 with respect to the base 1 fast enough to cause a slipping motion of the platform 3 with respect to the carrier along the interface 6; and then to retract the carrier to bring it back to a starting position with respect to the base slowly enough for the platform to remain at rest with respect to the carrier. An example of a suitable waveform is presented in FIG. 7. Such process is routinely referred to as the "slip-stick" motion.

The positioner further comprises a plurality of constraining surfaces 5 housing a plurality of rollers 7 which are capable of rolling between said surfaces. The rollers are pressed against the platform to ensure that the motion of the platform is along the direction set by containing surfaces; and to further ensure a loaded frictional contact of the carrier and the platform along the common interface 6. A preferred roller is ball-shaped; another preferred roller is cylindrical. Possible embodiments of rollers are not limited to spherical balls and cylinders; other shapes and arrangements known in the art of rolling bearings may be used in a positioner of this invention. Containing surfaces may be formed by guiding grooves 5, as represented in FIG. 1a through 1g.

Figure 1B:
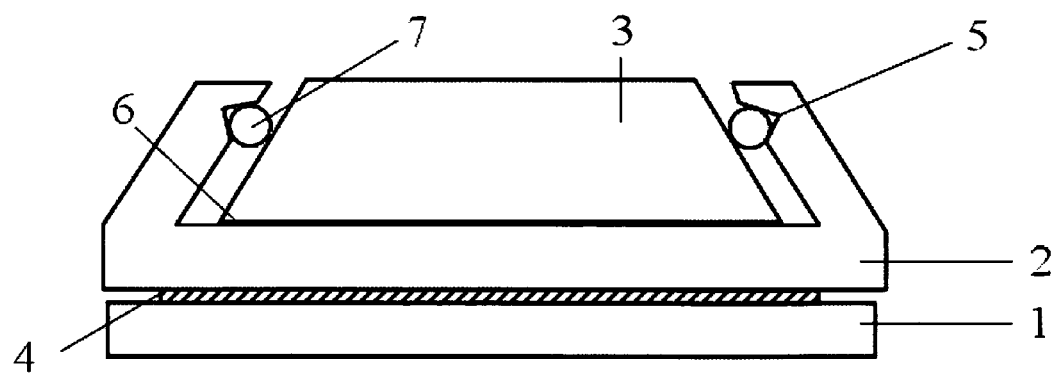

One containing surface may be the surface of the carrier 2, as represented in FIG. 1a and FIG. 1b. In another embodiment, such surface is the surface of the base 1 of the positioner, as represented in FIG. 1c and FIG. 1d.

Figure 1C:
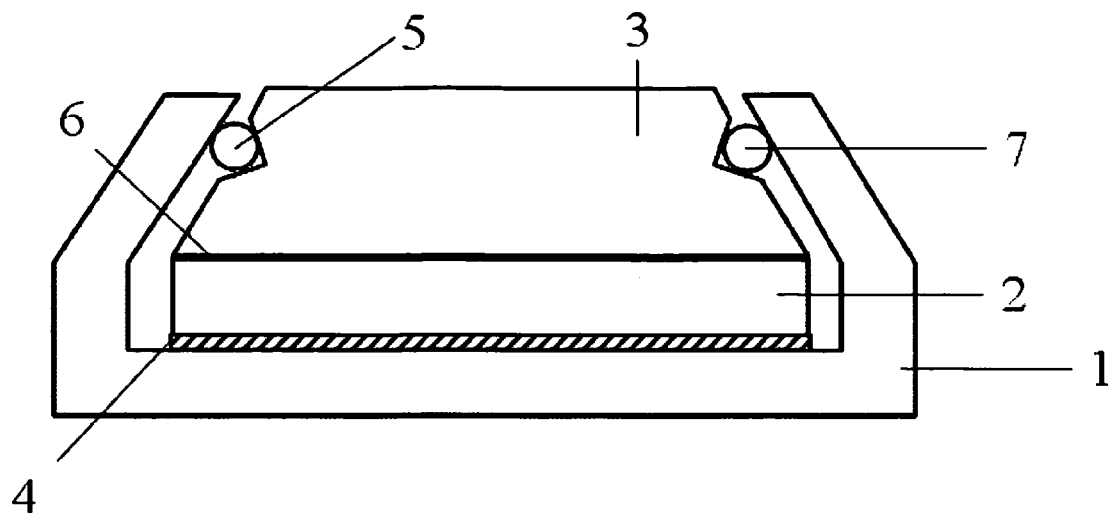
Figure 1D:
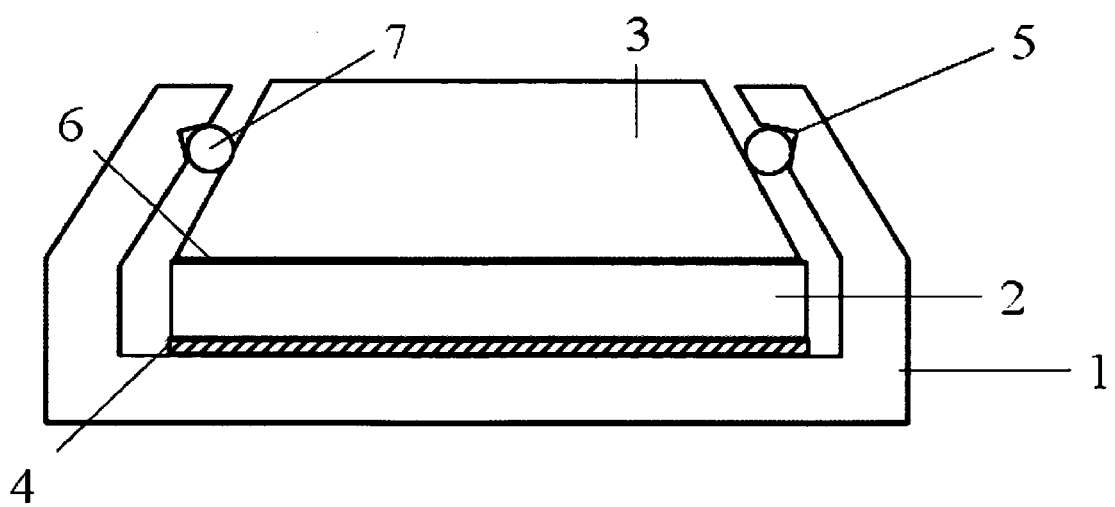

Two embodiments of a positioner with guiding grooves 5 disposed in the platform are represented in FIG. 1a and FIG. 1c. In another embodiment represented in FIG. 1b, a guiding groove is disposed in the carrier. In yet another embodiment represented in FIG. 1d, a guiding groove is disposed in the base. In yet another embodiment, a plurality of guiding grooves may be disposed in one or more of the elements comprising a positioner: a base, a carrier, and a platform.

Figure 1E:
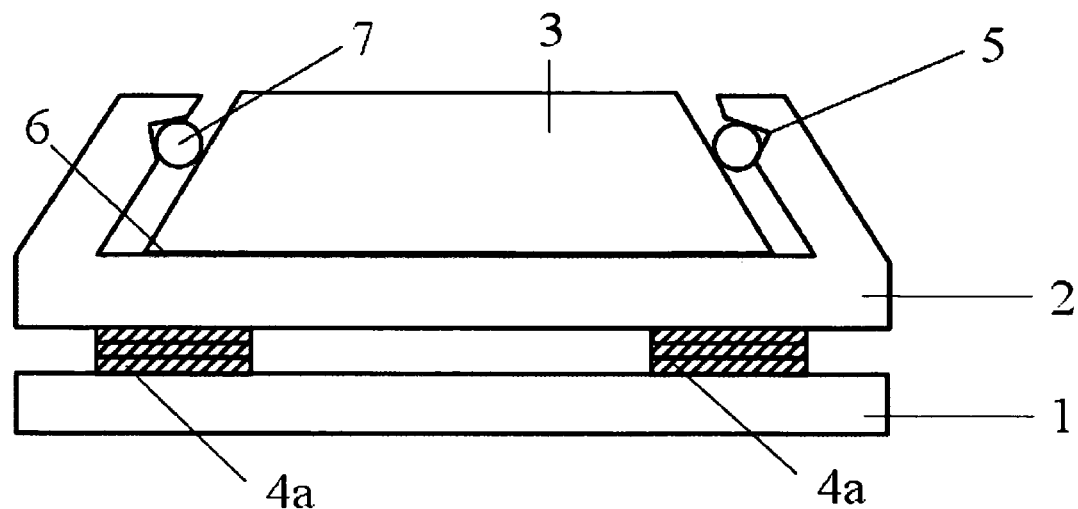
Figure 1F:
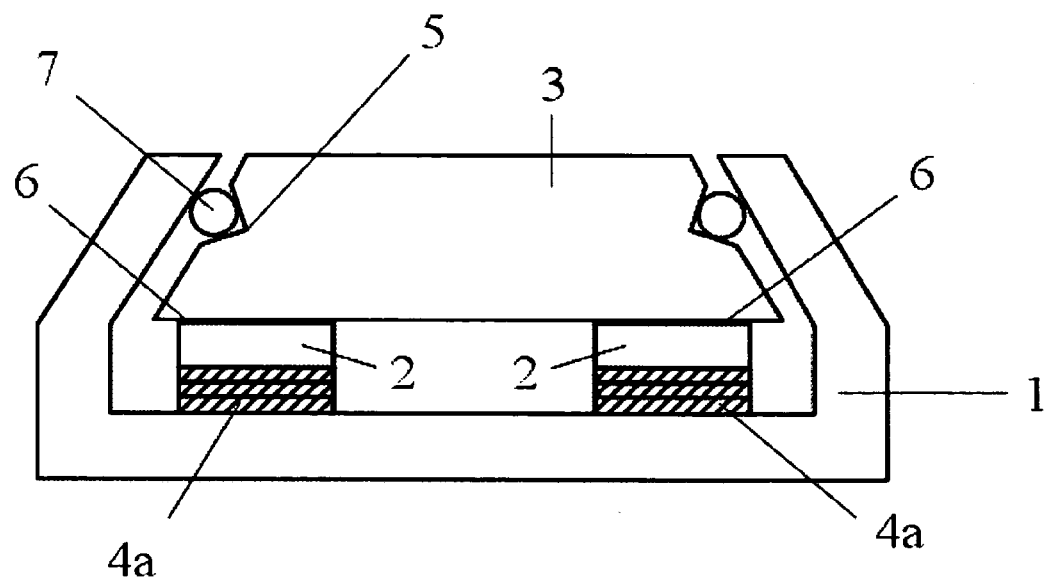
Figure 1G:
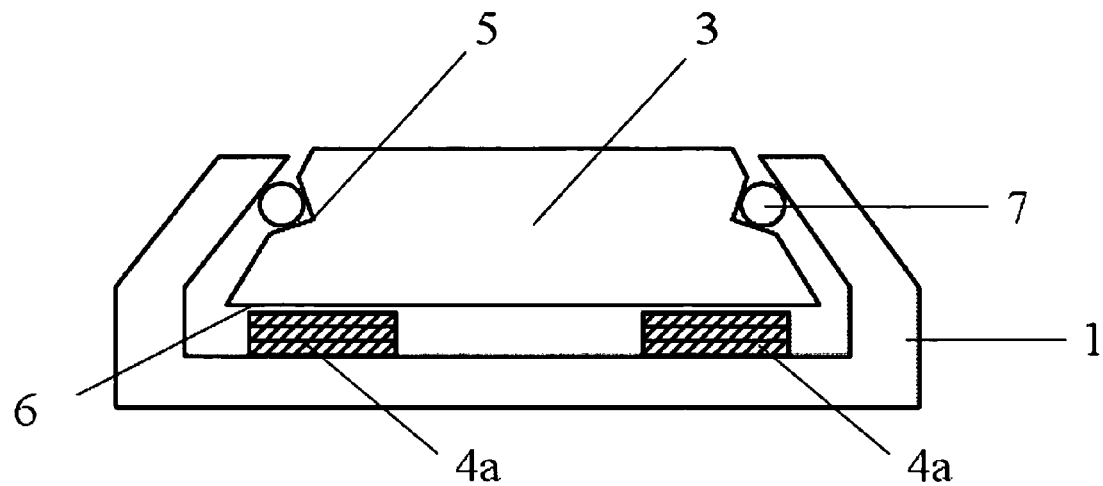

A piezo-electric actuator 4 may be a stack of sheer planar piezos 4a or a plurality thereof, as shown in FIG. 1e. In an embodiment represented in FIG. 1f a plurality of carriers 2, each mounted onto and rigidly attached to surfaces of piezo stacks, is disposed in a frictional engagement with the platform 3. In yet another embodiment represented in FIG. 1g the frame of a positioner is comprised of a base and a plurality of piezo stacks without a separate carrier; the frictional engagement is made directly between surfaces of piezo stacks 4a and the platform 3. The advantage of the last embodiment is the increased compactness and rigidity of a positioner.

Figure 1H:
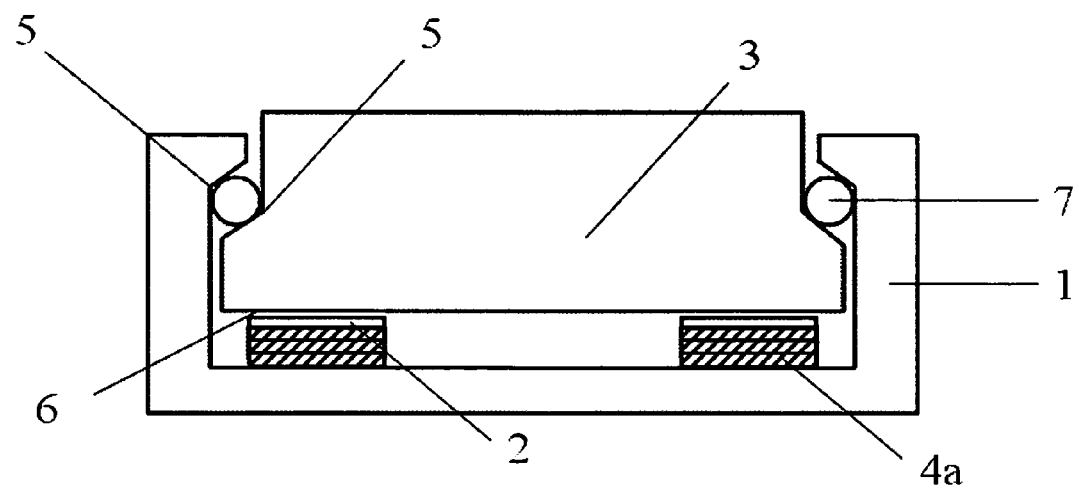

Numerous other embodiments of an inertial positioner will be immediately obvious to anyone skilled in the field. Another example from a multitude of embodiment within the scope of this invention is shown in FIG. 1h. In this embodiment, containing surfaces 5 are formed in the platform 3 and in the base 1, and a plurality of carriers 2 is mounted onto and rigidly attached to surfaces of piezo stacks 4a.

Figure 1J:
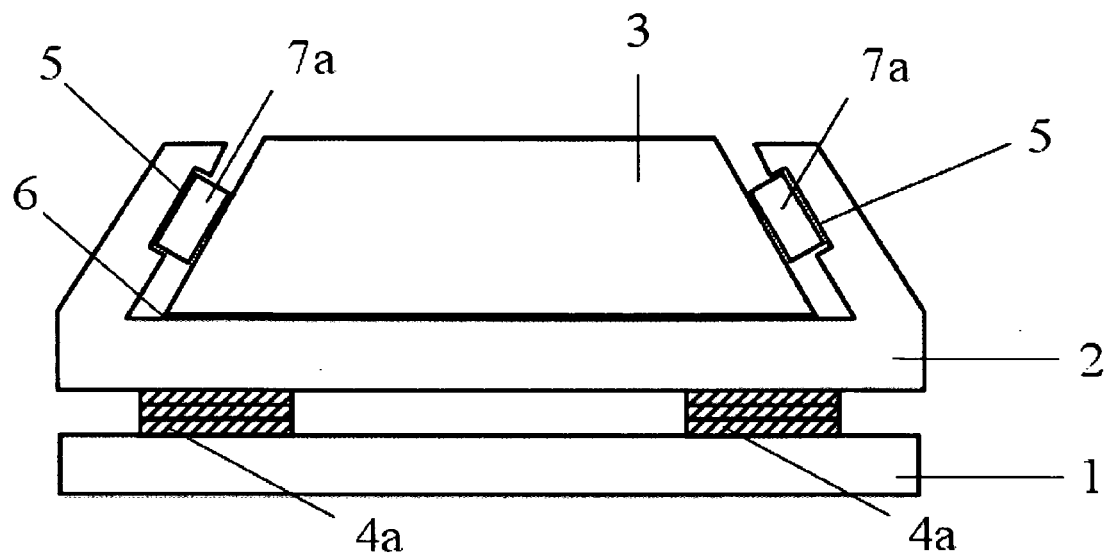
Figure 1K:
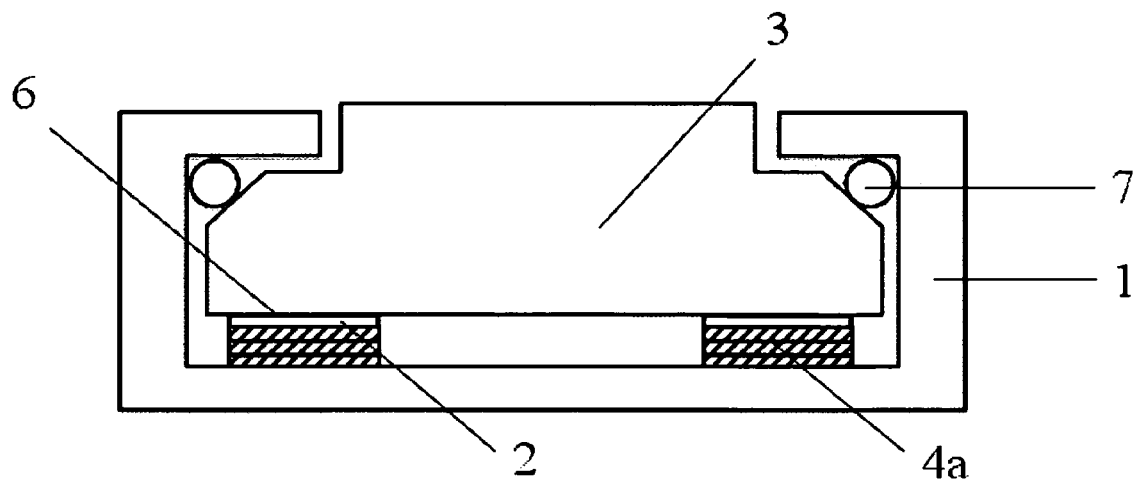

Yet another example of an embodiment shown in FIG. 1j comprises cylindrical rollers 7a housed in a plurality of grooves formed in a carrier 2. In yet another embodiment of a positioner represented in FIG. 1k spherical balls 7 are housed and rolling in a space formed by containing surfaces of base 1 and platform 3.

Rollers employed in these embodiments for the purpose of aligning the motion of the platform along the direction set by containing surfaces and creating a loaded frictional contact between the platform and a frame, can be machined from a number of rigid materials, such as alumina, tungsten carbide, stainless steel, or another refractory material, preferably the ones having Vickers hardness exceeding 1000 MPa. Surfaces of frictional engagement may formed by alumina, sapphire, titanium, lead zirconate titanate (PZT), and various ceramics. Inertial positioner in this invention is preferably a piezoelectric stack positioner made of lead zirconate titanate (PZT) or lithium niobate crystals (LiNbO3).

Figure 2:
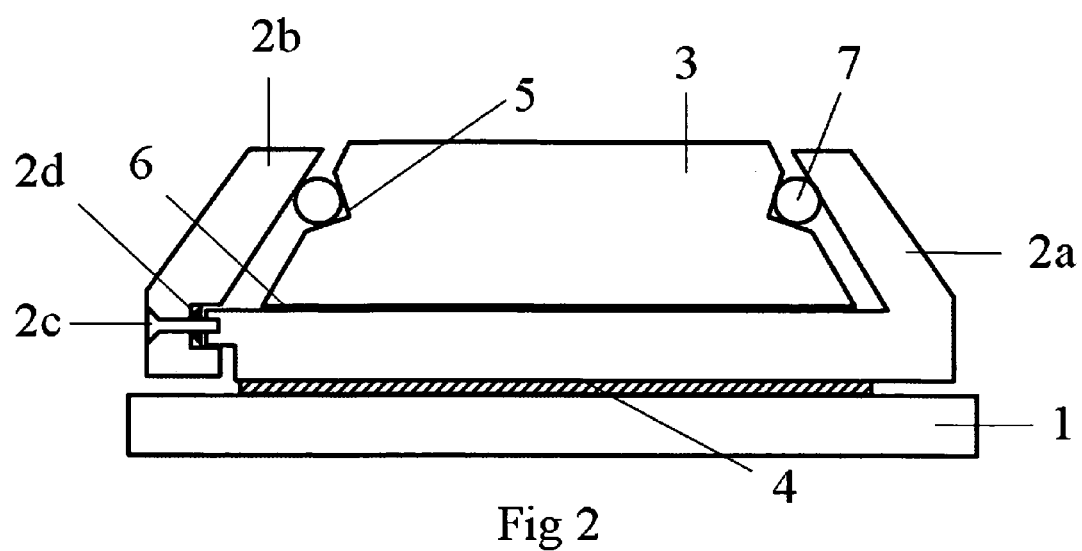
FIG. 2. An embodiment of a spring-loaded frame of the positioner

A base or a carrier of the positioner may be supplied with a spring-loaded mechanism, the function of which is to allow tuning the pressure on the interface between the carrier and the platform. Similarly, a carrier may be supplier with such spring-loaded mechanism. By varying this pressure, the shape of the voltage pulse required to cause a slipping motion of the platform with respect to the carrier, may be adjusted to specification. By way of example and not by way of limitation, a spring-loaded mechanism is represented in FIG. 2. According to this embodiment, a carrier 2 is comprised of a first element 2a, a second element 2b disposed to make a slip-fit contact to the first element, brought into contact with the first element by a plurality of screws 2c, spring-loaded by tightening a plurality of spring elements 2d. By turning the screws one achieves the target pressure between the carrier and the platform along the common interface 6. It will be obvious to anyone ordinarily skilled in the art of mechanical design that many spring-loaded arrangements will allow tuning the pressure on the interface between the carrier and the platform, and that such arrangements will fall into the scope of the present invention.

Figure 3:
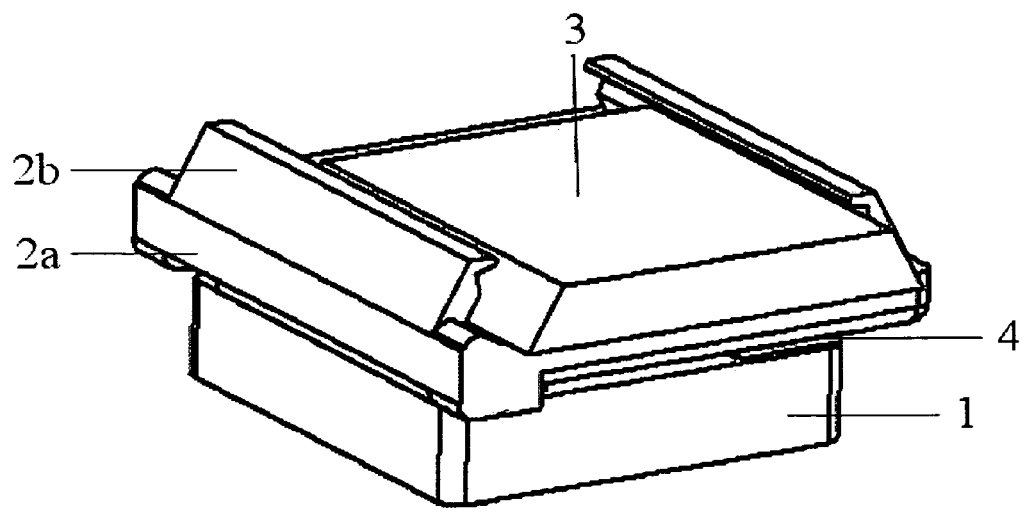
FIG. 3. A graphical projection of a preferred embodiment of an inertial single-axis positioner FIG. 4a. A cross section of a positioner that translates a movable platform along the axis of a cylindrical interface of frictional engagement between the platform and the carrier, wherein a platform is inserted into a carrier FIG. 4b. A view of the positioner represented in FIG. 4a; actuator and the spring member are not shown to reveal rollers and guiding grooves FIG. 4c. A view of the positioner represented in FIG. 4a; actuator is not shown to reveal a spring member FIG. 4d. A cross-sectional representation of an alternative embodiment of a positioner that translates a movable platform along the axis of a cylindrical interface of frictional engagement between the platform and the carrier, wherein a carrier is inserted into a platform FIG. 5. A graphical projection of a preferred embodiment of a three-dimensional positioner comprising a stack of single-axis positioners FIG. 6. A graphical projection of another embodiment of a three-dimensional positioner comprising a stack of single-axis positioners FIG. 7. An example driving voltage signal applied to a piezoelectric inertial actuator suitable for effecting slip-stick translational motion FIG. 8a. A schematic representations of three-axis position-sensing apparatus that measures the electric output of a quadrant photo detector to determine coordinates in the plane of the photo detector, and measures beam interference signal to determine the out-of-plane coordinate.

A graphical projection of a single-axis positioner wherein roller-containing surfaces comprise guiding grooves disposed in the carrier is presented in FIG. 3.

An interface of frictional engagement 6 can be a planar surface. In another embodiment, said interface comprises a cylindrical portion. One such embodiment is represented in a cross-sectional view of FIG. 4a. Base 1 is a block onto which a piezoelectric actuator 4 is rigidly mounted. Actuator 4 is preferably a stack of hollow piezo elements allowing the insertion of a hollow carrier 2 rigidly attached to the actuator 4. In a less preferred embodiment, the actuator 4 is a piezo tube. Platform 3 is inserted into the carrier and makes contact to it along interface 6 between the cylindrical outer surface of 3 and cylindrical inner surface of 2. By way of illustration and not by way of limitation, grooves 5 are disposed in the platform 3; each housing a ball 7. A spring element 2d presses on the balls 7 and thereby provides a pressure between the carrier and the platform along their common interface 6.

Figure 4A:
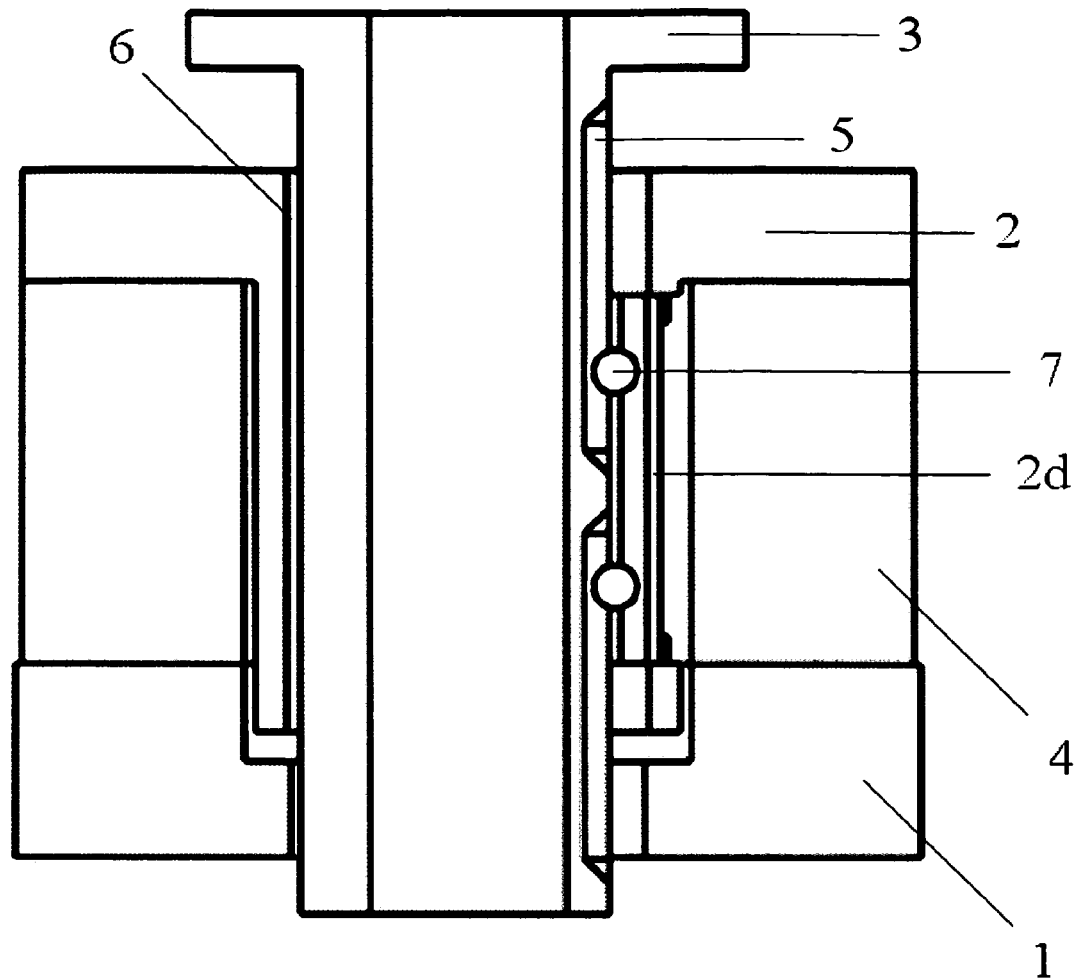
Figure 4B:
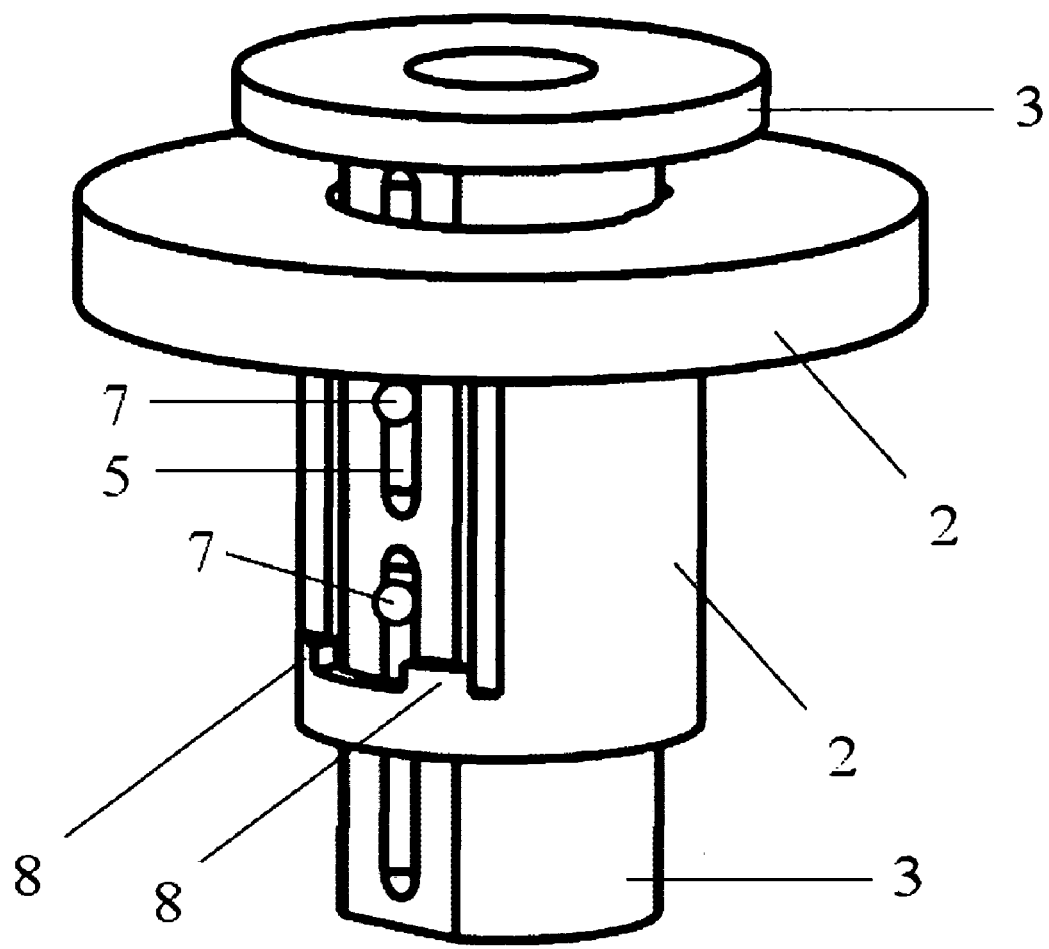
Figure 4C:
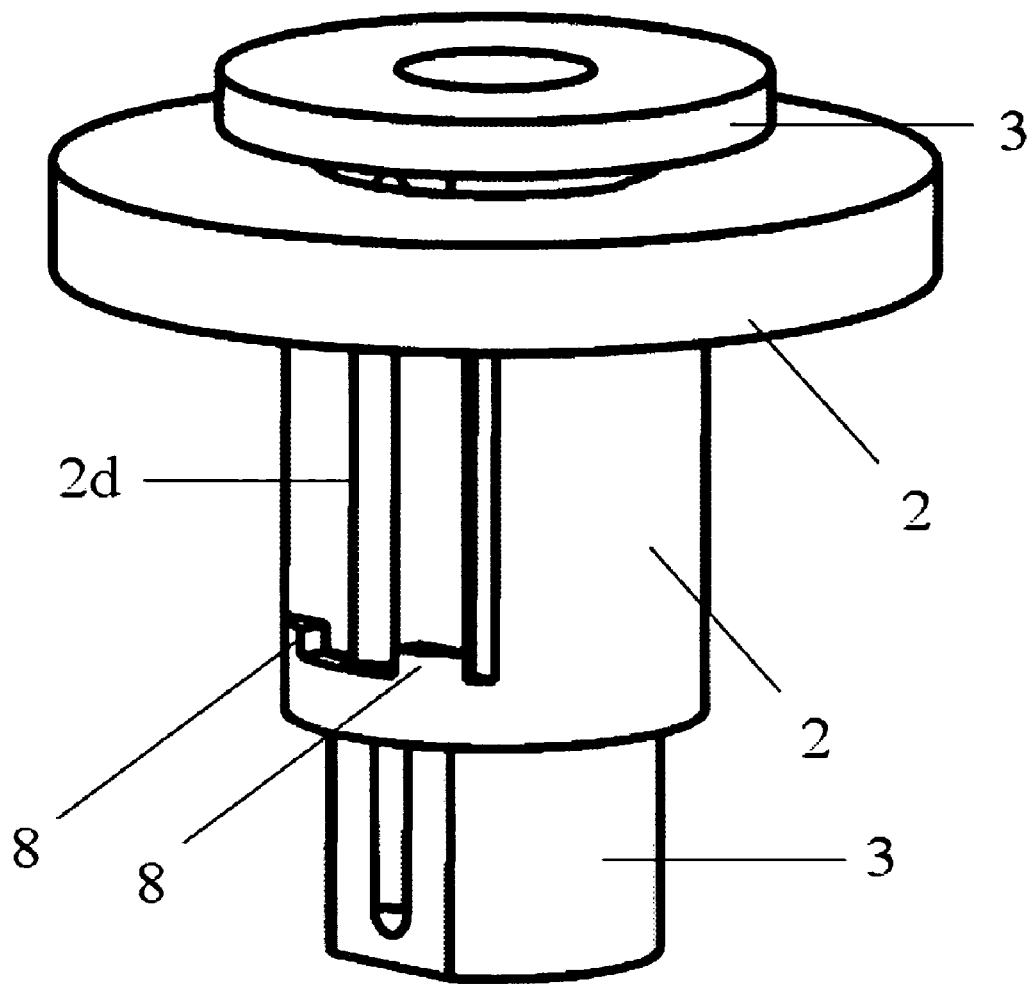

A graphical projection of the positioner of FIG. 4a is shown in FIG. 4b. The spring member and the piezo stack are not shown in this figure so as not to obscure guiding grooves 5 and balls 7. The spring member 2d in FIG. 4c is inserted into the carrier 2 and is held in place by retainers 8 formed in the carrier 2. The spring member 2d is pressing on balls 7 disposed in grooves 5, ensuring a loaded frictional contact between the platform and the carrier.

Figure 4D:
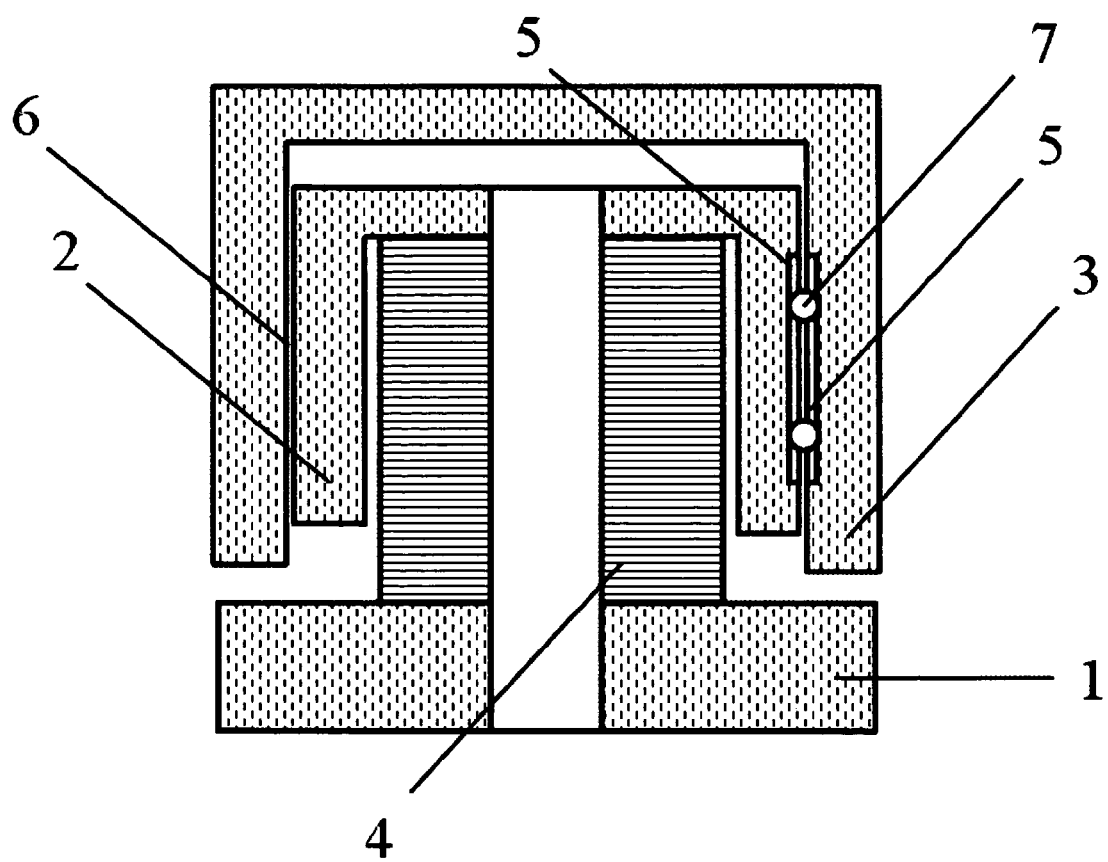

Another embodiment of a positioner having an interface of frictional contact comprising a cylindrical portion is represented in FIG. 4d. Here frictional engagement is created between the inner surface of platform 3 and the outer surface of carrier 2 inserted into platform 3.

Two single-axis positioners can be stacked together by rigid attachment between a platform of a first single-axis positioner and a base of a second single-axis positioner, resulting in an instrument for positioning an object in 2 dimensions. Three invented single-axis positioners can be stacked together by rigid attachment between a platform of a first single-axis positioner and a base of a second single-axis positioner, and further between a platform of a second single-axis positioner and a base of a third single-axis positioner resulting in an instrument for positioning an object in 3 dimensions. The platform of a first single-axis positioner may serve as a base of a second single-axis positioner, and similarly, the platform of a second single-axis positioner may serve as a base of a third single-axis positioner. Two embodiment of such instrument are presented in the graphical projection in figures FIG. 5 and FIG. 6. The preferred embodiment of FIG. 5 comprises two positioners in which common interface of frictional engagement is planar, and another positioner in which said interface comprises a cylindrical portion.

The advantage of multi-axis positioners obtained by stacking single-axis positioners disclosed above is their compactness and rigidity. The latter property is important for achieving high mechanical resonant frequencies on the order of or higher than 10 kHz. For example, at a mechanical resonant frequency of 50 kHz, which is attainable in a multi-axis positioner assembled from disclosed single-axis positioners, the platform is capable of translational motion at a typical speed of 1 mm/sec. Rigidity is also necessary for achieving the desired insensitivity to ambient mechanical vibrations. Low profile of a positioner is important for attaining rigidity and is achieved by choosing height of an inertial positioner between 0.1 and 0.75 of the square root of the product of its footprint.

The invention of a positioner disclosed herein is not limited to geometries illustrated in FIGS. 1 through 6. It will be appreciated by anyone skilled in the art of positioning instruments that a multitude of other embodiments comprising an inertial actuator and rollers which are employed to press on an interface of frictional engagement between a moving element and a frame element of a positioner will fall into the scope of this invention.

II. An Optical Instrument for Determining Coordinates

Figure 8A:
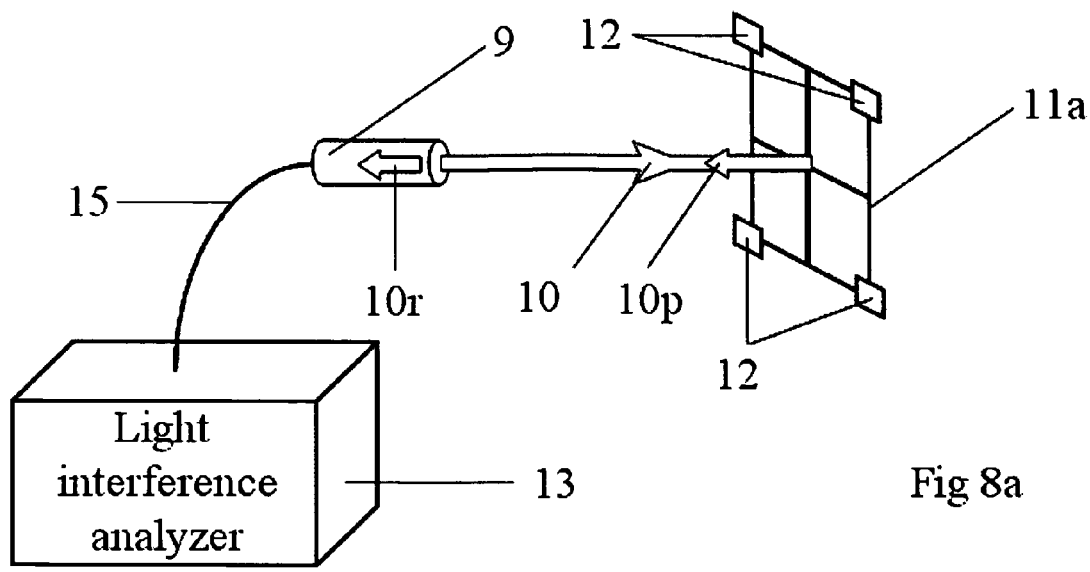
FIG. 8b. A schematic representations of three-axis position-sensing apparatus that measures the electric output of a position-sensing photo detector to determine coordinates in the plane of the photo detector, and measures beam interference signal to determine the out-of-plane coordinate.
FIG. 8c. An alternative embodiment of a beam-collimating lens and a semi-reflecting planar mirror FIG. 8d. An alternative embodiment of a beam-collimating plurality of curved mirrors and a semi-reflecting curved mirror FIG. 9 A view of the interferometric instrument for measuring coordinates of the platform of the last positioner in the stack with respect to the base of the first positioner in the stack of a three-dimensional positioner shown in FIG. 5

Another aspect of the invention is the optical instrument for determining coordinates to enable position control. A preferred embodiment of an optical position-measuring apparatus is represented in FIG. 8a. In this embodiment, the apparatus requires substantially one beam of light, preferably a laser light, to probe all coordinates in a 3-dimensional space. Turning to the representation in FIG. 8a, a beam of light 10 is emanating from the collimating lens 9 which is coupled to an optical fiber 15, at a direction normal to the surface of a quadrant (4-cell) position-sensitive light detector 11a. The collimating lens 9 is preferably a gradient refractive index lens or another collimating optical element or a plurality thereof. A reference beam 10r resulting from reflection of beam 10 by the inside surface of the collimating lens, or by a separate element with a semi-reflecting surface, is directed toward the analyzer 13. Probing beam 10p is resulting from reflection of beam 10 by the surface of the detector 11a and is thus directed to reenter the fiber 15 and to interfere with the reference beam 10r. Hence, partially reflective surface of the quadrant light detector 11a plays the role of a sensing arm, while partially reflective surface of the collimating lens 9 plays the role of a reference arm of the interferometric part of this apparatus. The intensity of interfering beams 10r and 10p depends on phase accumulation caused by displacement of the detector 11a with respect to the fiber end; and hence the position of the photo detector 11a along the axis of the fiber end can be inferred by the analyzer 13. The center of a photo detector with respect to x,y position of the light spot formed on the surface of the detector by the incoming beam 10 can be inferred from its electrical signals at electrodes 12.

Figure 8B:
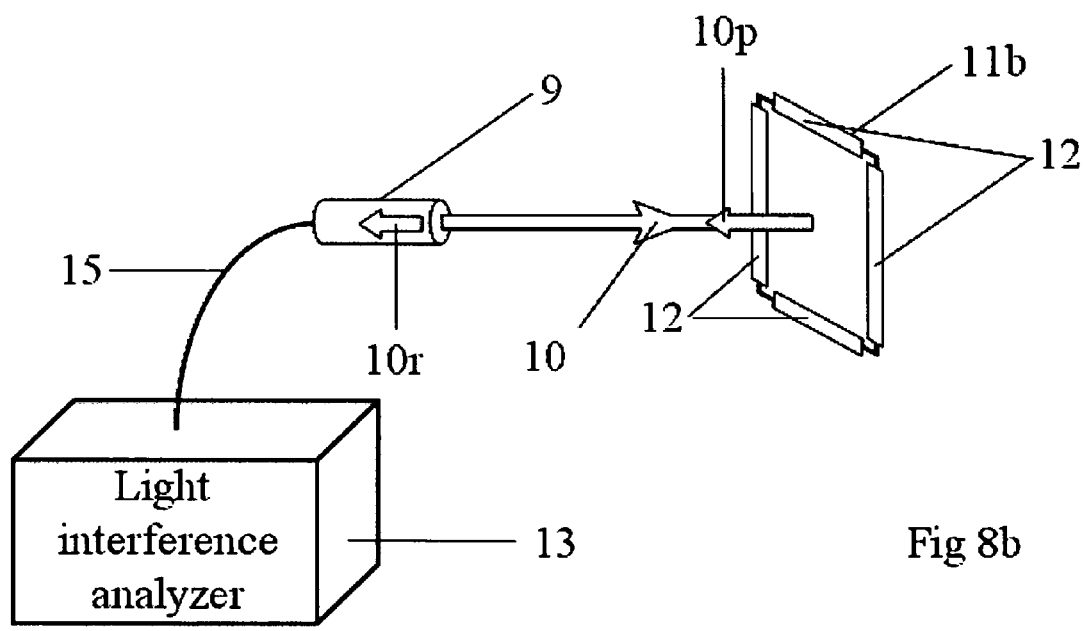

Another embodiment of a position-measuring apparatus is represented in FIG. 8b. In this embodiment, the position-sensitive photodetector is a continuous rectangular light detector 11b, operating on the basis of current spreading. The photocurrent generated by the incoming beam 10 is spreading to electrodes 12 along resistive paths defined by the location of the spot where beam 10 impinges on the detector 11b, thus relating voltage outputs at electrodes 12 of the detector to its x,y position with respect to the fiber end.

A disclosed instrument for position readout and control comprises a probing beam of light 10, a position-sensing detector 11a, and an interference analyzer 13. This enables determination of all 3 coordinates of the photo-detector 11a with respect to the fiber end.

Figure 8C:
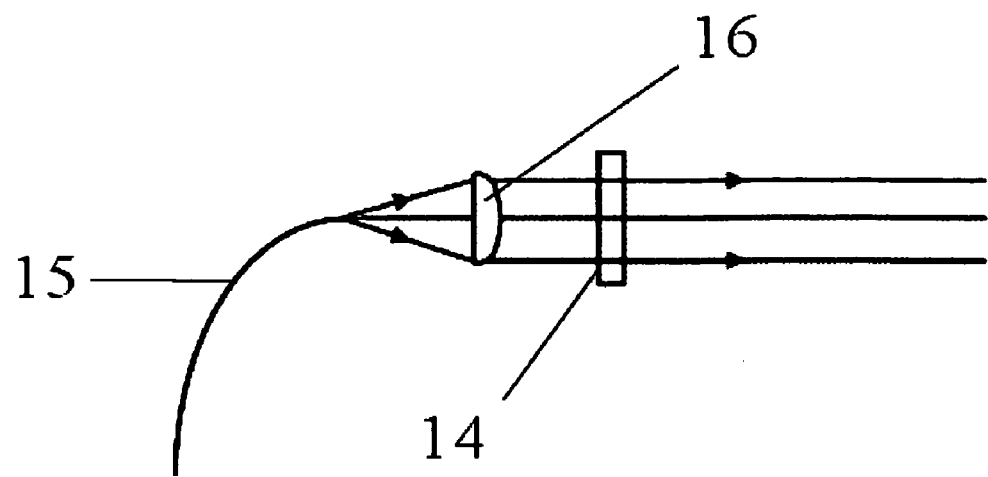
Figure 8D:
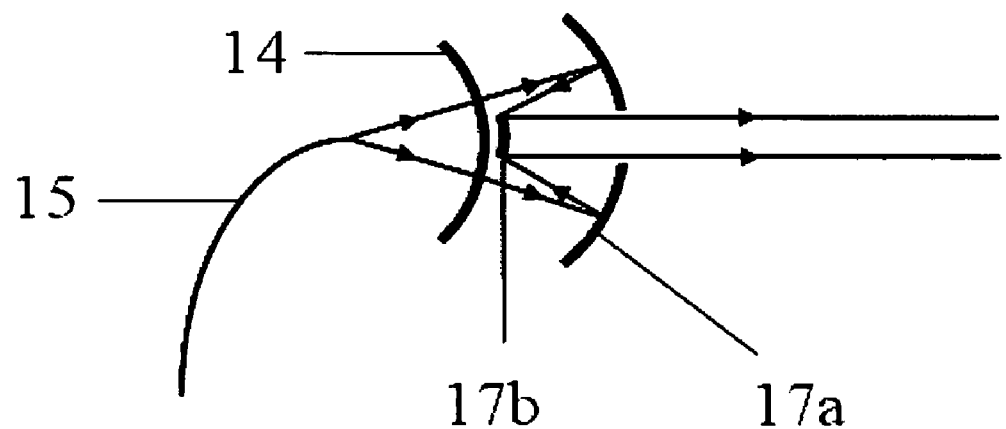

Alternative embodiments for creating a probing beam and a reference beam are shown in FIG. 8c and FIG. 8d. In FIG. 8c a conventional lens 16 is used for beam collimation and a separate planar element with a semi-reflective surface 14 is introduced to create a reference beam reentering the fiber 15. In FIG. 8d a spherical mirror with a semi-reflective surface 14 is introduced to reflect diverging light emanating from a fiber end back into the fiber, thus creating a reference beam, while the collimation of light emanating from a fiber end is achieved by two curved mirrors 17a and 17b as shown schematically in FIG. 8d. These alternative embodiments require precise alignment and are therefore less preferred than those represented in FIGS. 8c and 8d.

The advantages of the disclosed instrument illustrated in FIGS. 8a and 8b with respect to the existing position-sensing instruments are many. The number of components comprising the position-measuring apparatus is minimal: a single source of collimated light is required for positional readout and control in all 3 dimensions; a single position-sensitive photodetector for reading x and y coordinates also serves as a sensing arm of a fiber interferometer for reading z.

Figure 5:
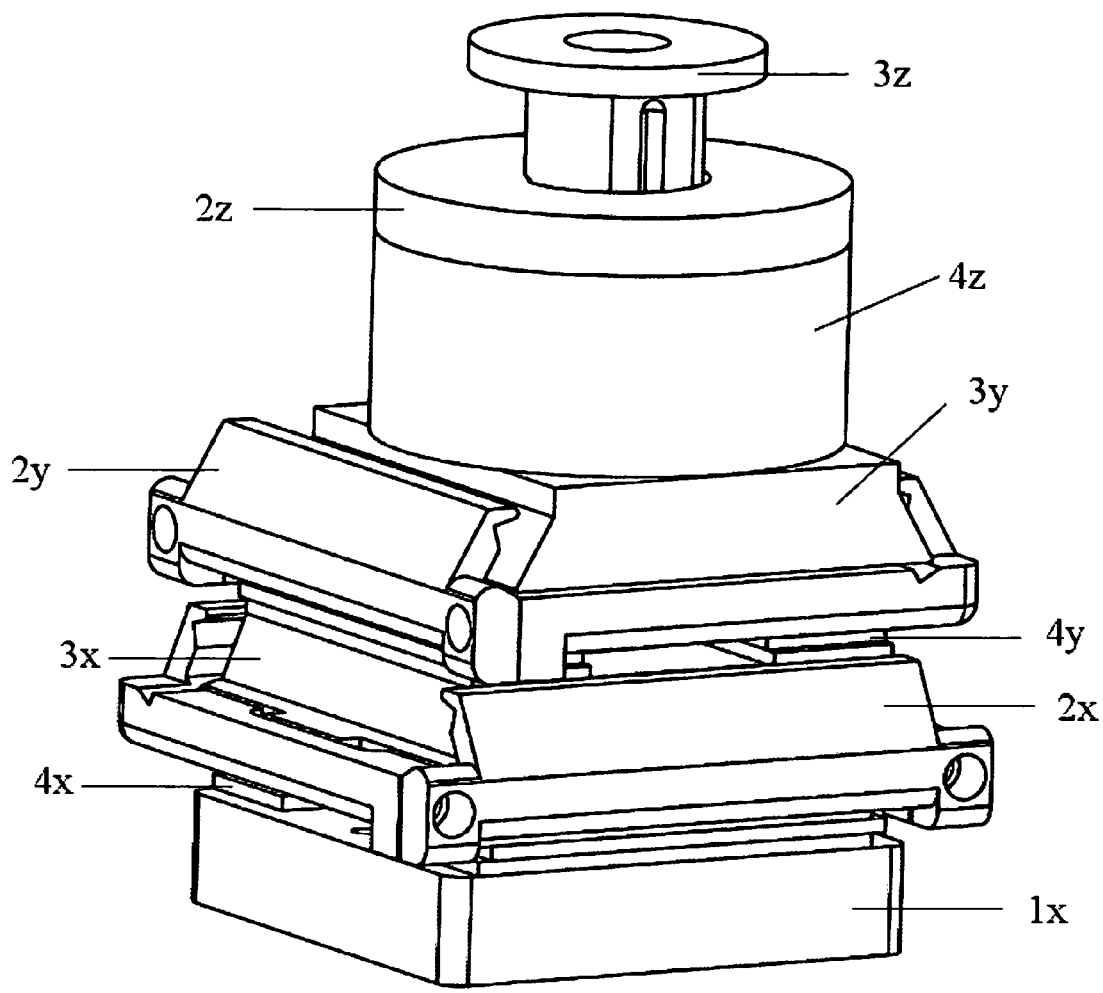
Figure 6:
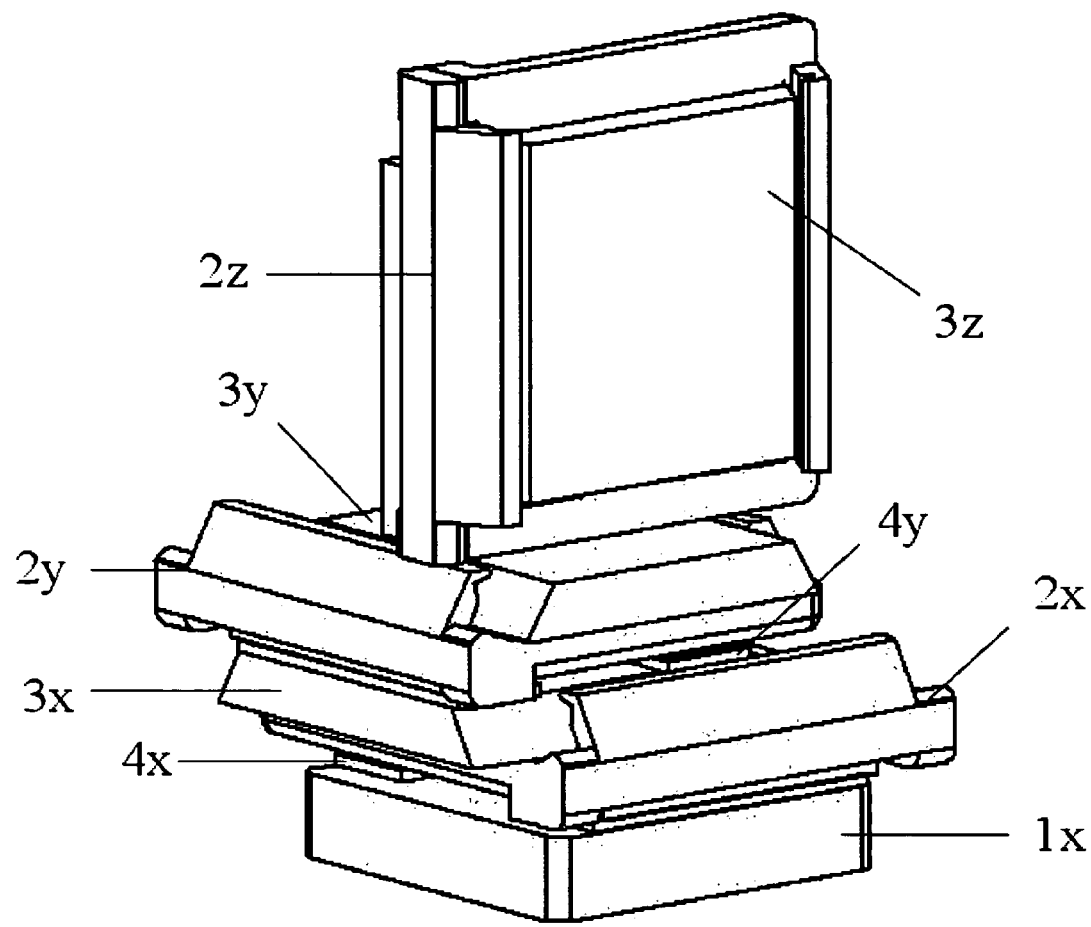
Figure 9:
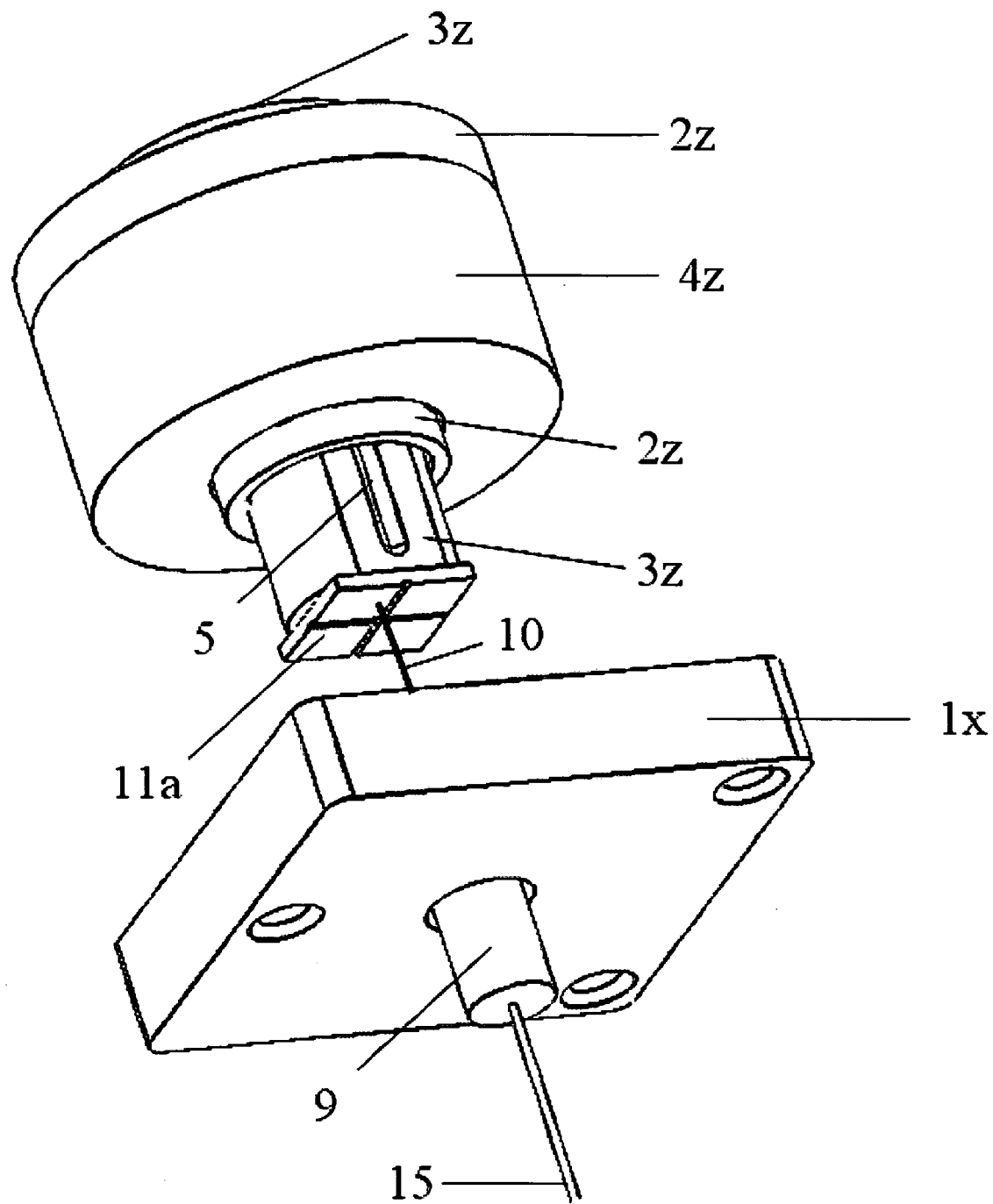
Figure 10:
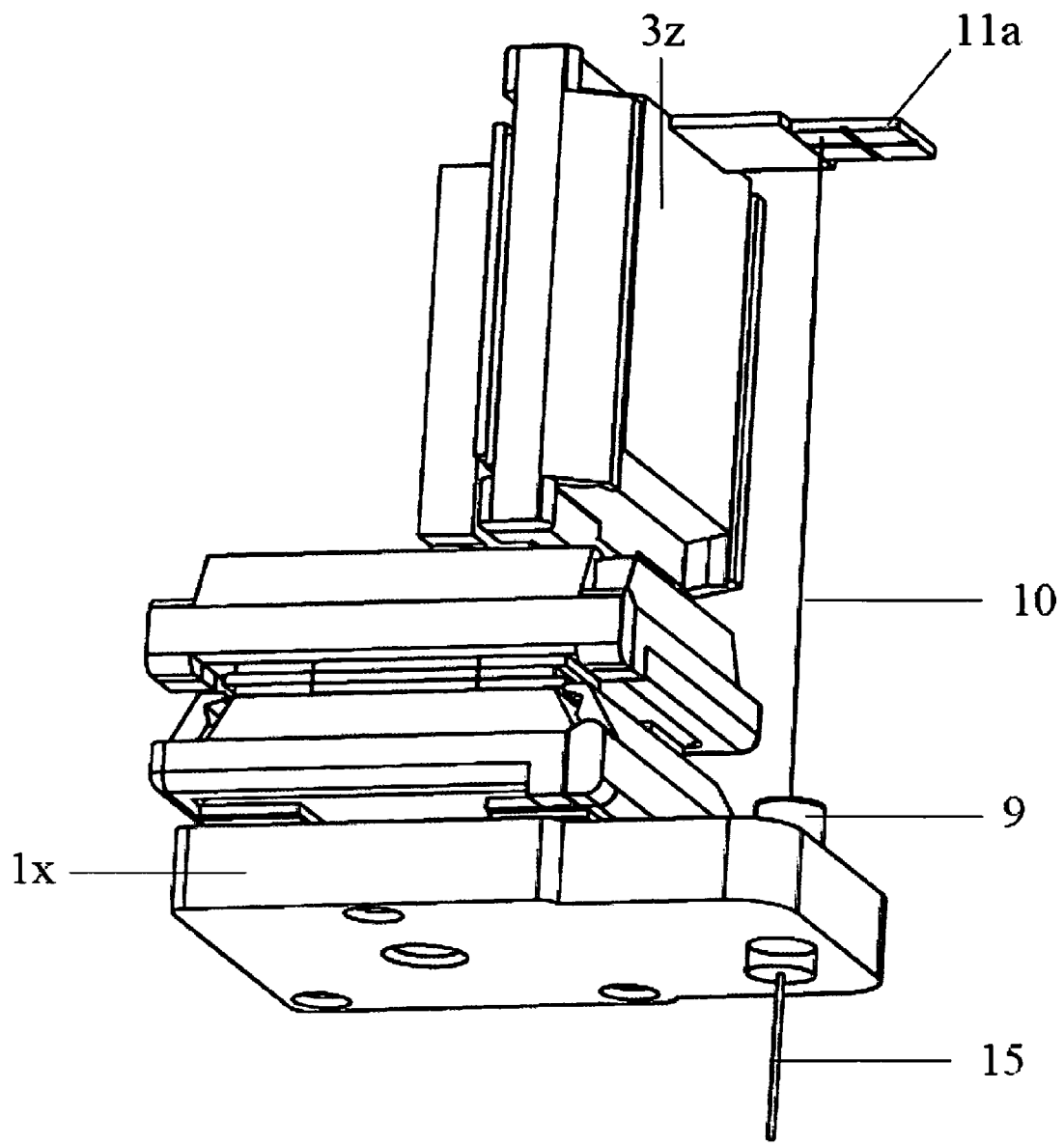
FIG. 10 A view of the interferometric instrument for measuring coordinates of the platform of the last positioner in the stack with respect to the base of the first positioner in the stack of a three-dimensional positioner shown in FIG. 6

Furthermore, integration of such instrument with a positioner is straightforward, as illustrated by graphical projections in FIG. 9 and FIG. 10. An integrated instrument is a stack of single-axis positioners; and an interferometric/position-sensitive module for coordinate readout and control disclosed above. The x and y positioners which are shown in FIG. 5 are omitted in FIG. 9 for clarity of representation of the position-measuring apparatus. A collimating lens 9 is affixed to the base 1x of the first positioner in the stack, while the position-sensitive photodetector 11a is disposed at the right angles with respect to the direction of the probing beam 10 and is affixed to the platform 3z of the last positioner in the stack. Thus, the optical module is reading the position of the platform 3z with respect to the base 1x. A preferred embodiment represented in FIG. 9 is characterized by compactness and small footprint, in part due to enclosing an optical module for determining coordinates within a 3-axis positioner.

III. A Mounting Assembly

Another aspect of the current invention is a mounting assembly. A disclosed assembly may be suitable for carrying various objects on a platform of a positioner disclosed above. An assembly comprises a receiving member, possibly affixed to a platform of a mechanical stage or a positioner; and a holder that may carry a variety of objects, for example, a scanning probe for SFM, STM or other microscopy; a micromanipulator; a micro-machined SEM; a microdispenser, a micro- or nano-indenter, and many other types of samples, probes or devices. If voltage is applied across electrodes formed in the holder and the receiving member, which are brought into close proximity of each other, an electrostatic clamping force is created between these electrodes, holding the assembly together. Further, electrode pairs are formed in the holder and the receiving member. These can be insertion electrodes of the pin-receptacle type, pogo pin type electrodes, or other similar electrode pairs. Input and output terminals of a device carried by the holder can be permanently connected to holder-side electrodes; when a holder and a receiving member are joined to form an assembly, the connection between these terminals and electrodes on the receiving member is made, facilitating control or probing of the carried device. Electrode pairs of insertion type ensure alignment between the holder and the receiving member. Alternatively, separate aligning elements may be formed in the assembly.

Figure 11:
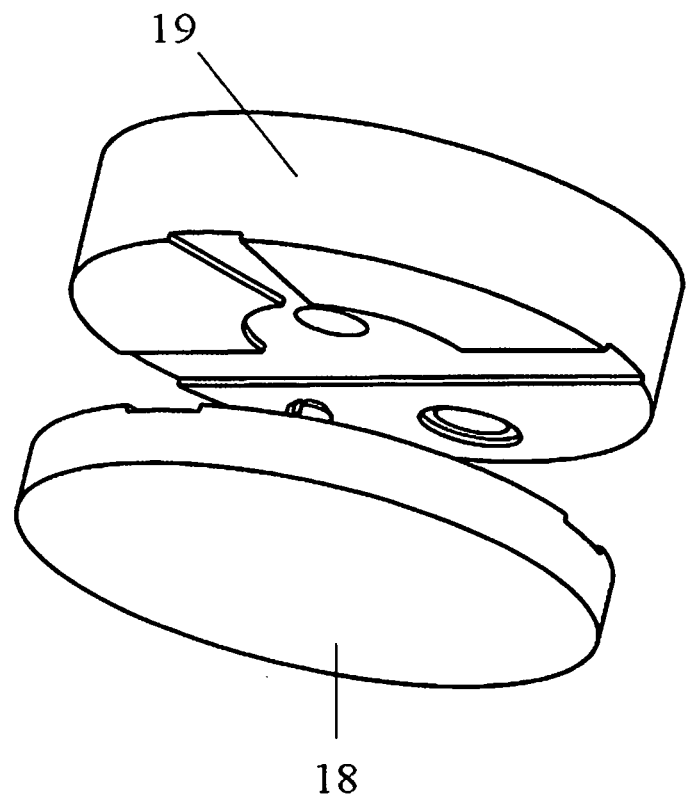
FIG. 11. Two graphical projections of a mounting assembly comprising a receiving member and a device holder FIG. 12. A graphical projection detailing a receiving member of a mounting assembly FIG. 13. A graphical projection detailing a device holder of a mounting assembly FIG. 14a. A cross-sectional view of an alternative embodiment of a mounting assembly comprising spring loaded electrodes formed in a holder and receptacle electrodes formed in a receiving member FIG. 14b. A cross-sectional view of an alternative embodiment of a mounting assembly comprising spring loaded electrodes formed in a receiving member and receptacle electrodes formed in a holder FIG. 14c. A cross-sectional view of an alternative embodiment of a mounting assembly comprising spring loaded electrodes formed in a holder and pad-like electrodes formed in a receiving member, and separate guiding elements FIG. 14d. A cross-sectional view of an alternative embodiment of a mounting assembly comprising spring loaded electrodes formed in a holder and pad-like electrodes formed in a receiving member, and separate spring-loaded guiding elements FIG. 14e. A cross-section of an alternative embodiment of a mounting assembly comprising spring loaded electrodes formed in a holder and pad-like electrodes formed in a receiving member, and conical guiding surfaces. A holder of this embodiment viewed in the direction facing its clamping electrode FIG. 14f. A cross-sectional view of an alternative embodiment of a mounting assembly not requiring electrical connection to a clamping electrode formed in the holder FIG. 14g. A cross-sectional view of an alternative embodiment of a mounting assembly wherein clamping is effected by applying electric field across ring or frame-like electrodes FIG. 15. An exemplary mounting assembly carrying a probe and affixed to a positioner
Figure 11:
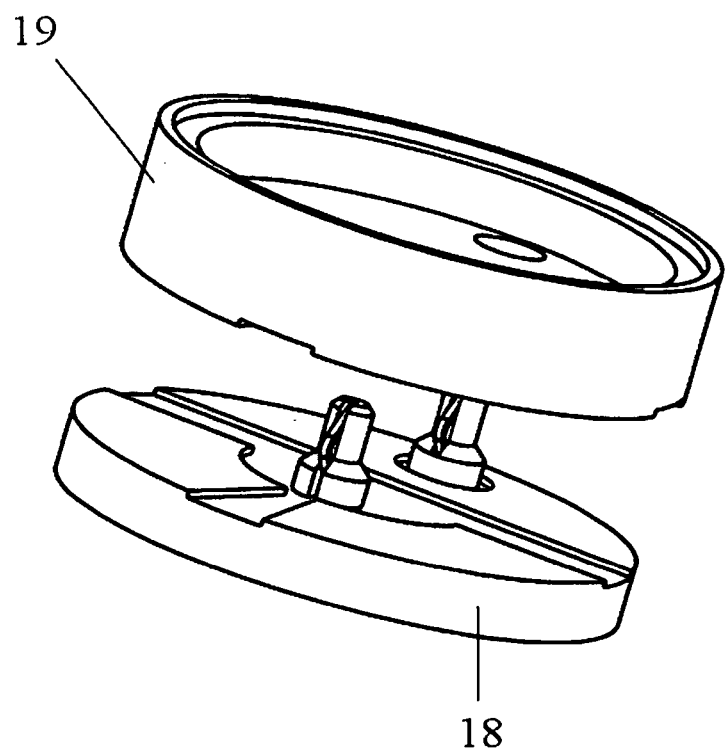

An exemplary electrostatically clamped mounting assembly comprising a receiving member 18 and a holder 19 is represented in two graphical projections in FIG. 11. In one embodiment, a receiving member 18 comprises a plurality of electrically conductive pins and a plurality of clamping electrodes disposed on a preferably insulating surface. Such receiving member may be affixed to the platform 3z of a last positioner in a positioner stack comprising a three-axis positioner, a preferred embodiment of which is shown in FIG. 9. or to any other suitable carrier, stage, positioner, robotic arm or a pick-and-place tool.

Holder 19 comprises a plurality of receptacles for making electrical connection to the conductive pins of the receiving member 18 and a plurality of clamping electrodes disposed on its insulating surface. In this embodiment one pin-receptacle pair is necessary for clamping action. For example, a pin electrode formed in the receiving member may be electrically connected to a source of electric field. A receptacle in the holder corresponding to this pin electrode is connected to a clamping electrode of the holder. A clamping electrode on the surface of the receiving member may be grounded. Alternatively, a clamping electrode on the holder surface may be grounded. Application of electric filed between clamping electrodes on the receiving member side and on the holder side results from insertion of the pin into the receptacle, effecting attractive force between clamping electrodes and securely clamping the holder to the receiving member.

Another pin-receptacle pair may be used for making electrical connections to an object mounted on the holder, which may be a scanning probe, a manipulator, a dispenser, a micromachine, an optical probe, an indenter, or any other suitable device.

Figure 12:
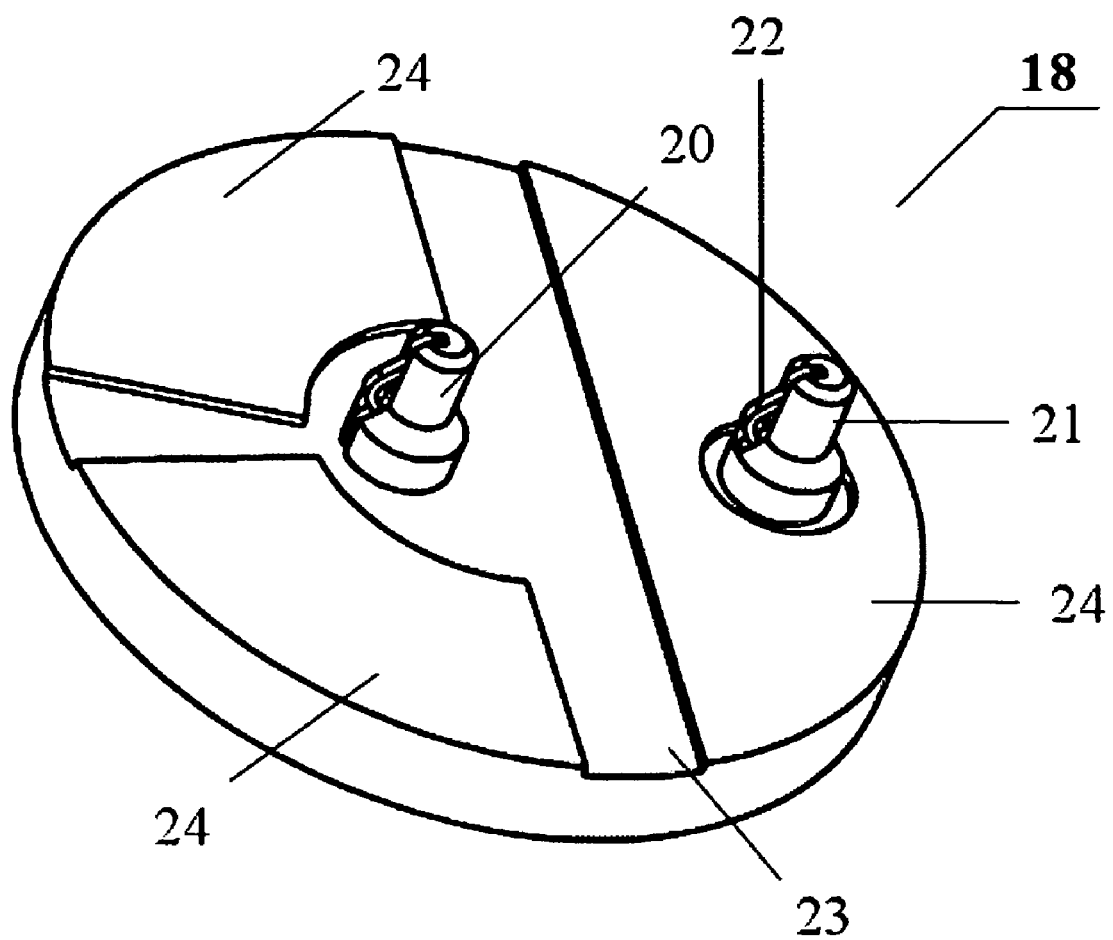
Figure 13:
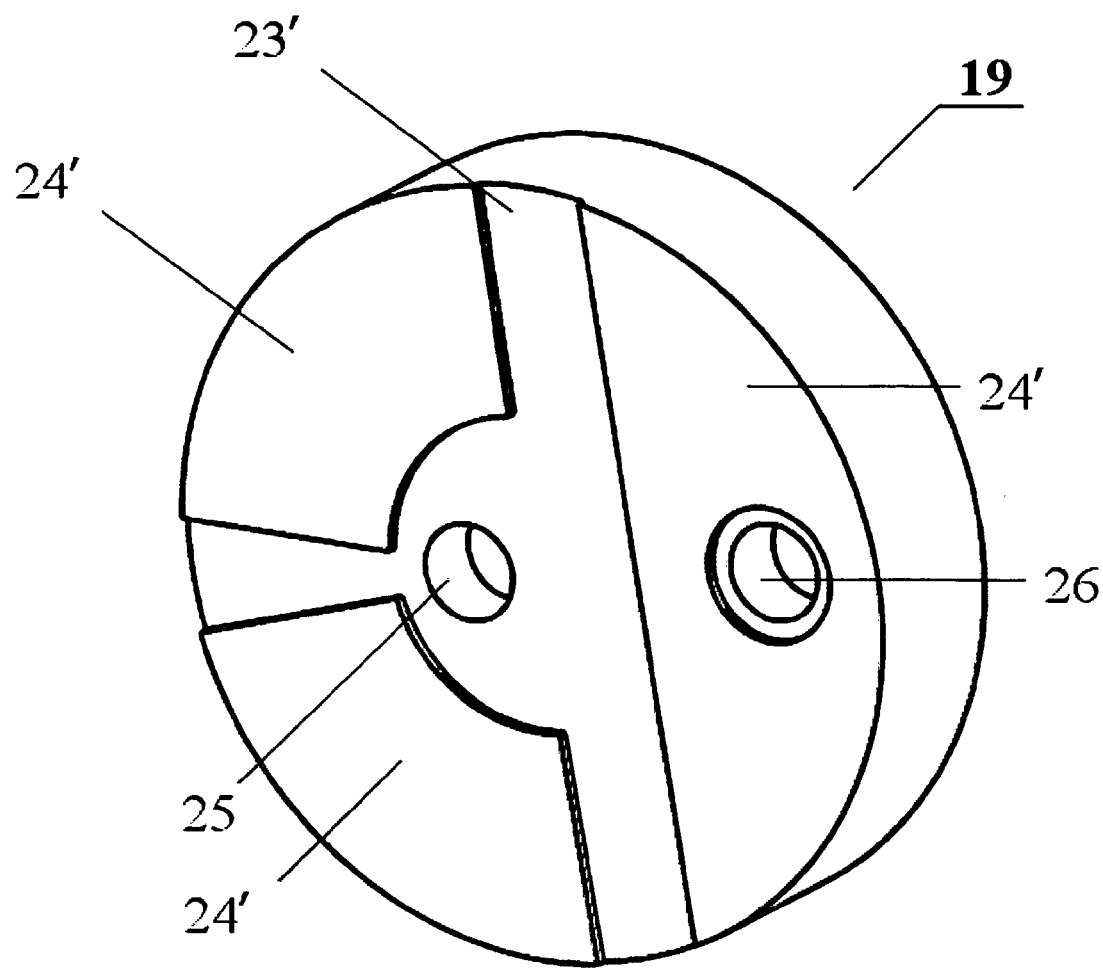

Now turning to the preferred embodiments of a receiving member and a holder presented in FIG. 12 and FIG. 13, respectively, a plurality of clamping electrodes 24 is disposed on the electrically insulating surface 23 of the receiving member, and similarly, a plurality of clamping electrodes 24' is disposed on the electrically insulating surface 23' of the holder. A layer of an insulator, preferably made from a high dielectric permittivity material, covers clamping electrodes 24 of the receiving member. In another embodiment of the mounting assembly, an insulating layer, preferably a high dielectric permittivity material, covers clamping electrodes 24' of the holder.

Spring members 22 aid reliable electrical and mechanical contact between pin 20 and the conducting inner surface of receptacle 25; and pin 21 and inner surface of receptacle 26, respectively. Pins and receptacles provide alignment of holder 19 and receiving member 18 with respect to each other during insertion, minimizing tilt and rotational (in-plane) misalignment. In this embodiment, receptacle 26 formed in the holder is wired to clamping electrodes 24'. Pin 21 of the receiving member is permanently connected to clamping electrodes 24. When the assembly is put together, pin 21 is inserted into receptacle 26. By applying a potential difference between electrodes 21 and 24 of the receiving member, the electric field is created between electrodes 24 and 24', effecting electrostatic clamping of the holder to the receiving member.

While pin 21 is used to engage electrostatic clamping, pin 20 can be used for applying electrical signals to or measuring characteristics of the carried object via electrical connection to receptacle 25 if this receptacle is wired to a terminal of said object.

A receiving member can be affixed to a platform of an inertial positioner, providing a convenient way of securely locking the holder to the platform, and allowing either manual or automatic swapping of various devices mounted on holders by disengaging electrostatic clamping. Such automatic swapping can be achieved, for example, by a robotic arm or an automated picking and placing tool. Further, a receiving member of the mounting assembly affixed to a platform of a three-axis positioner can play a role of a picking and placing tool. For example, a worn probe or a microdispenser, or another device disposed on a holder of the assembly may be removed from the work area, disengaged and discarded or stored, then a new device on a holder may be picked up by the receiving member by reengaging electrostatic clamping, a brought into the work area. This embodiment has an additional advantage of allowing automatic swapping of holders safely, away from the work area by retracting the holder over a macroscopic distance. This is possible because the available throw of the positioner disclosed above substantially exceeds 1 mm.

As an alternative to an embodiment represented in FIG. 12 and FIG. 13, one or more pins may be disposed on the holder while the corresponding receptacles may be formed in the receiving member. The number of pin-receptacle pairs in the disclosed mounting assembly can be as many as necessary for applying electrical signals to or probing an object carried by the holder.

Figure 14A:
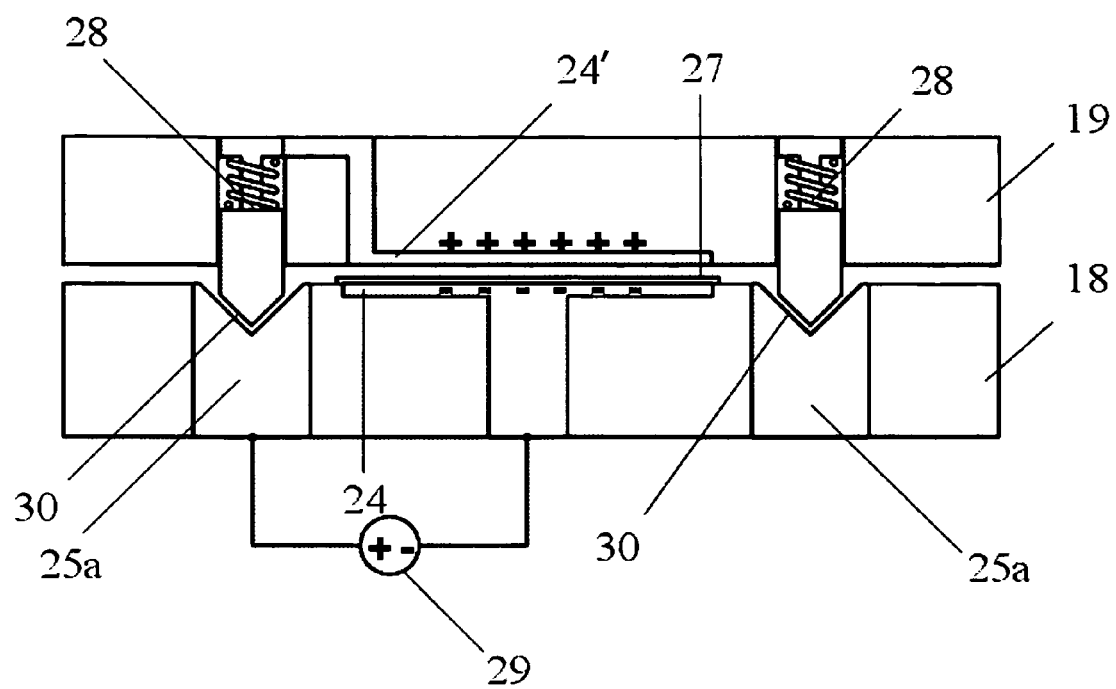

Another embodiment of a mounting assembly is shown in a cross-sectional representation in FIG. 14a. Receptacle electrodes 25a formed in the receiving member and spring-loaded electrodes 28 formed in the device holder have guiding surfaces 30 that guide the holder into receiving member during insertion. In this present embodiment guiding surfaces are conical. A variety of surfaces having a guiding function will be immediately obvious to anyone ordinarily familiar with mechanics: they may comprise spherical, cylindrical, pyramid-like, or more complex shapes. A electrical potential difference is provided by a source 29 between a guiding electrode in the receiving member 25a and a spring loaded electrode 28 formed in the holder; the latter electrode is permanently wired to a clamping electrode 24' which is brought into close proximity of clamping electrode 24, thus creating electrostatic clamping of the holder to the receiving member. Polarity of the source 29 is inessential and is such as shown by way of example only. A layer of insulating material 27, preferably made of a high permittivity dielectric or a piezoelectric, is disposed on the clamping electrode 24. In an alternative embodiment a layer of electrically insulating material 27 is covering a holder-side clamping electrode 24'. Another pair of electrodes 25a and 28 may be used for transmitting electrical signals between the receiving member 18 and a device carried by the holder 19. Not all available pairs of electrodes 25a-28 necessarily provide guiding of the holder into receiving member during insertion. For example, all but two electrode pairs may be such that their receptacle electrodes are substantially flat and therefore do not have guiding function.

Guiding surfaces disclosed above make the mounting assembly particularly suitable for automated holder placement, by reducing sensitivity to placement inaccuracy such as misalignment, in-plane rotation, and tilt. For example, a picking and placing tool that carries a holder by vacuum suction could place it over a receiving member with an offset, which will be corrected by self-aligning function of guiding surfaces.

Figure 14B:
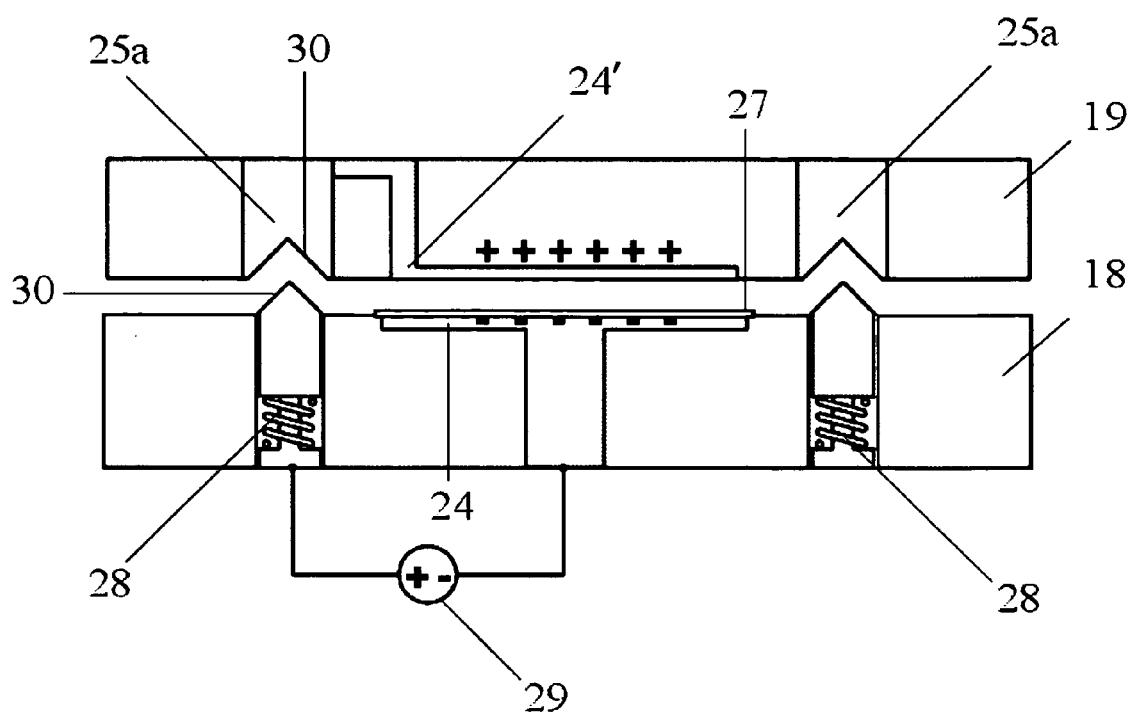

Another embodiment of a mounting assembly comprising a holder and a receiving member, wherein electrodes 25a are formed in a holder 19, while spring-loaded contacts 28 are formed in a receiving member 18 is represented in FIG. 14b. Guiding surfaces 30 guide the holder into receiving member during insertion.

Figure 14C:
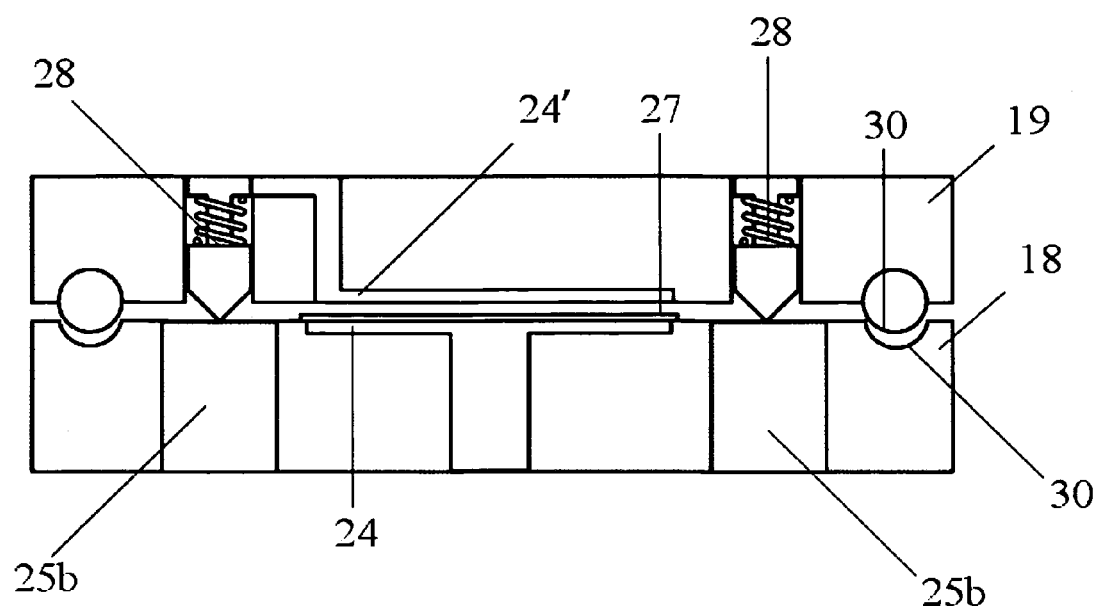
Figure 14D:
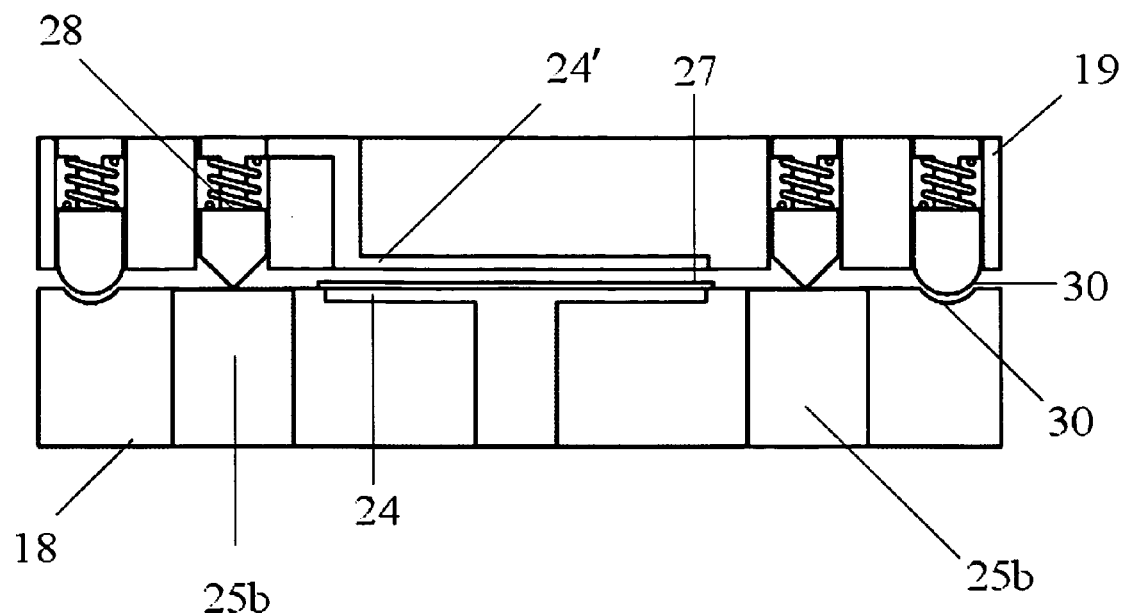

In another embodiment of a mounting assembly represented in FIG. 14c electrode pairs comprising pad-like electrodes 25b do not have a guiding function. Instead, guiding, alignment, and minimization of in-plane rotational placement inaccuracy during joining of the assembly is provided by separately formed guiding elements having surfaces 30. By way of example, surfaces 30 of this embodiment are concave and convex pairs, preferably spherical. Many other types of guiding surfaces comprising spherical, conical, cylindrical, planar, and combinations thereof, as well as other shapes fall within the scope of this invention. Guiding surfaces 30 may be formed on spring-loaded guiding members, as represented in FIG. 14*d*.

Figure 14E:
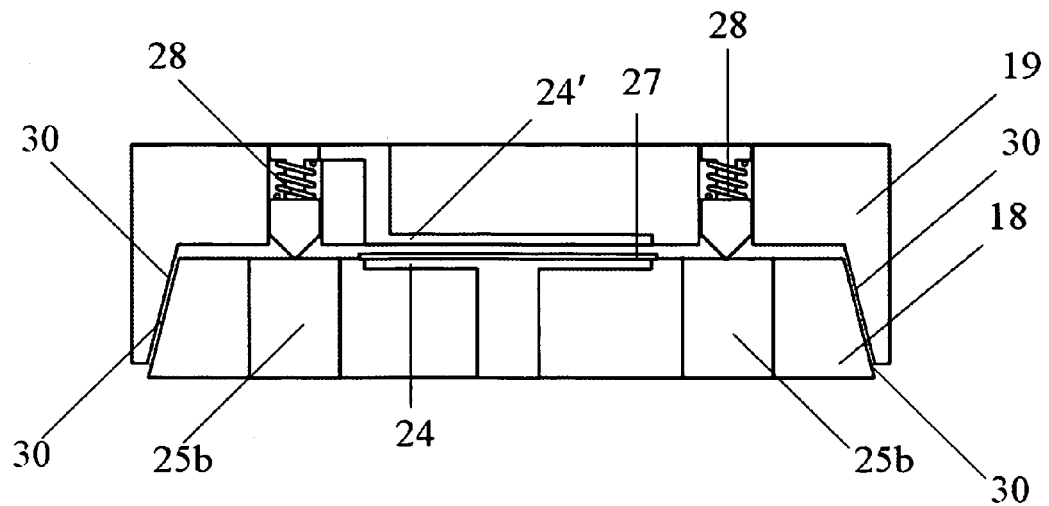
Figure 14E:
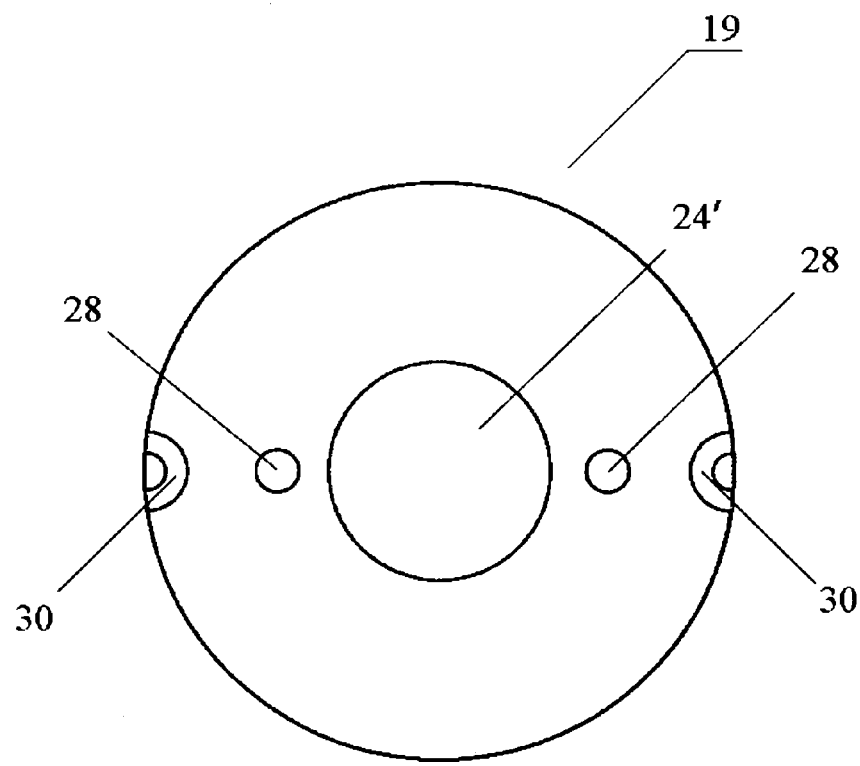

Yet another embodiment of an assembly capable of minimizing inaccuracy of placement during joining of the assembly is represented in FIG. 14*e*. Guiding surfaces having conical shapes 30 are formed by standoffs on the holder side and corresponding cutouts in the receiving member.

Figure 14F:
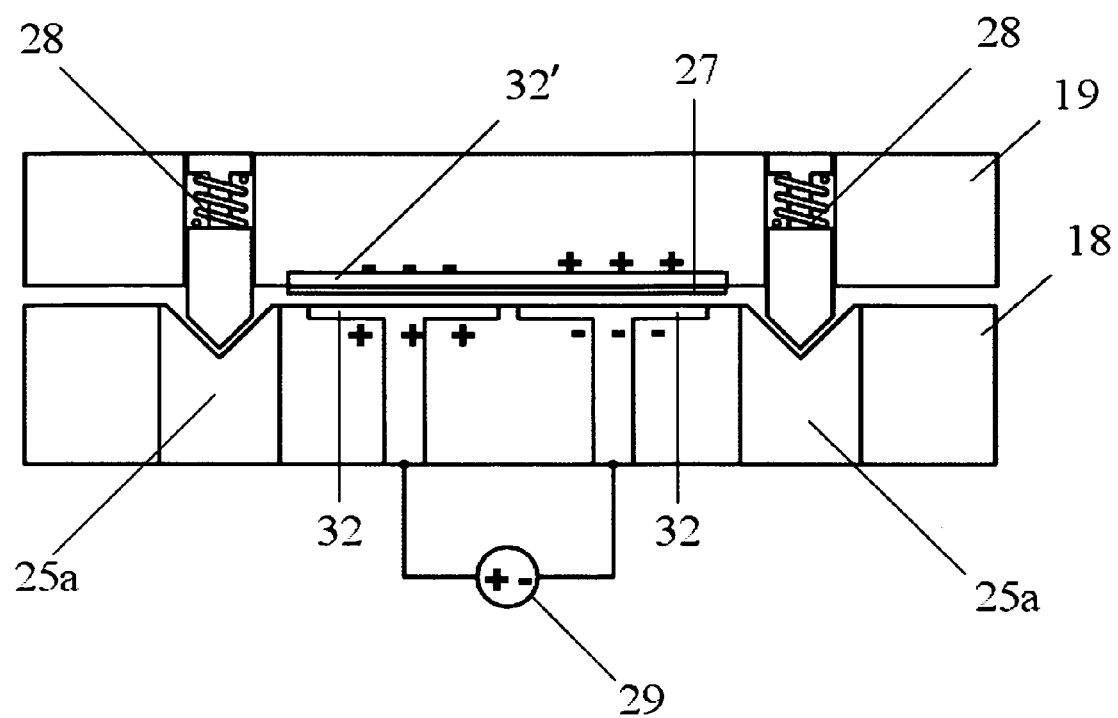
Figure 14G:
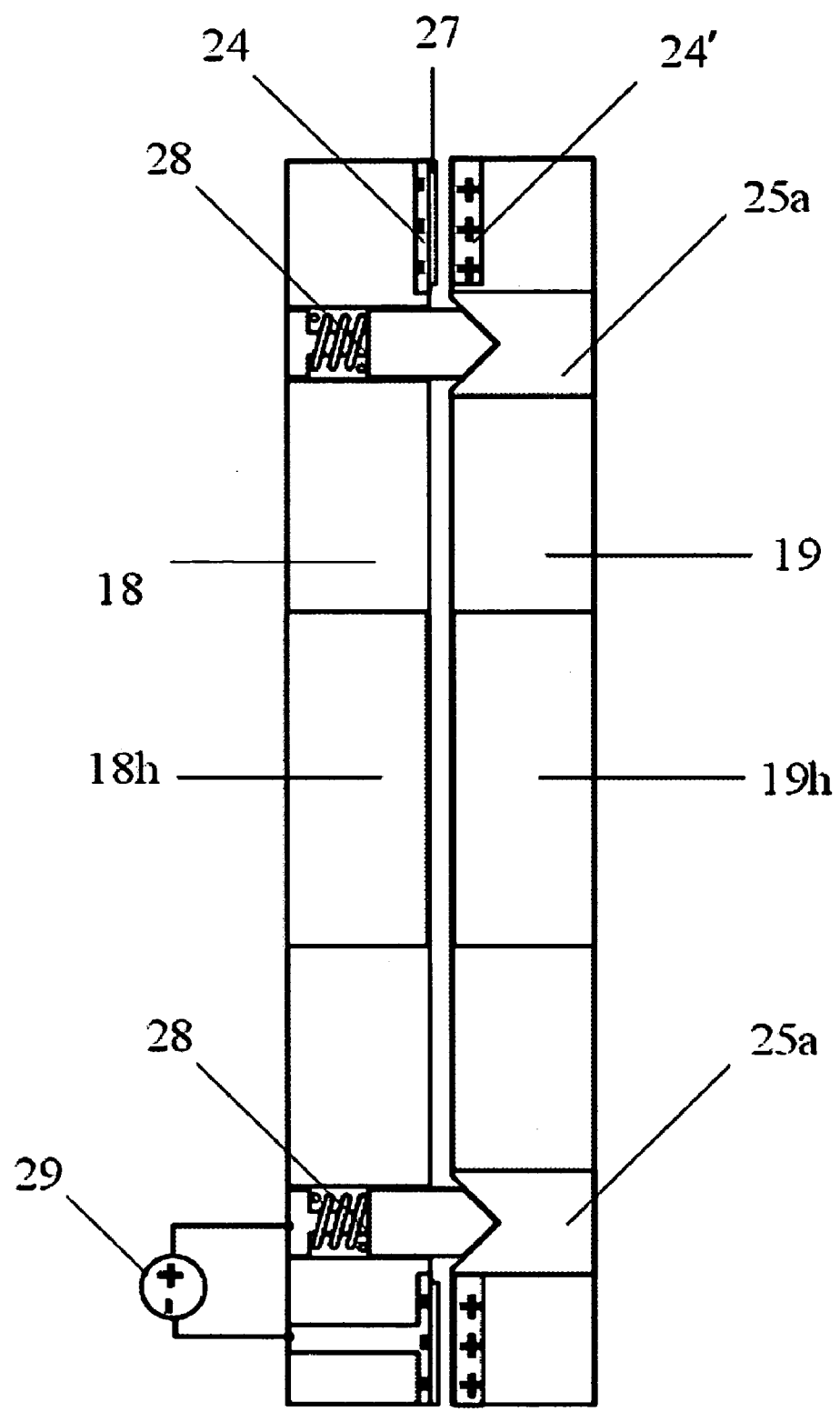

Yet another embodiment of a mounting assembly is represented in FIG. 14*f*. In this embodiment clamping of the holder 19 to the receiving member 18 is achieved by applying a potential difference between split electrodes 32 formed in the receiving member. As a result of capacitive coupling between electrodes 32 and 32' the electric field and the associated with it clamping force is created between holder and receiving member. Since an electrical connection to holder-side electrode 32' is not necessary in this embodiment, all available electrode pairs 28-25*a* can be used for applying electrical signals to or probing the carried object.

In yet another embodiment of a mounting assembly clamping electrodes 24 and 24' have a frame or ring-like shape, as shown in a cross-sectional representation of the assembly in FIG. 14*h*. A similarly shaped insulating layer 27 covers a clamping electrode 24 on the receiving member of the assembly. In an alternative embodiment, insulating layer 27 covers a holder-side clamping electrode 24'. This embodiment is particularly useful if a line of sight to an object carried by holder 19 is desirable, for example, for optical probing of said object. Light can be guided through transparent path, for which purpose optional cutouts 18*h* and 19*h* can be made in the assembly.

Many other embodiments of the disclosed mounting assembly will be obvious to anyone skilled in the art of the field of this invention. Embodiments which are capable of making electrical connection to an object mounted onto a holder, clamping of a holder to a receiving member electrostatically, and maintain alignment between parts of an assembly, will fall within the scope of this invention. Other less preferred ways of creating a clamping force are possible, for example, clamping may be effected magnetically.

Embodiments of a mounting assembly disclosed above are suitable for automatic handling by a robotic tool. For example, a device on a holder may be picked up by a robotic arm and discarded after use or picked up and removed from the receiving member for further analysis, and a new device on another holder can be brought in and clamped to a receiving member. For another example, a positioner of the present invention with a receiving member attached to it may discard a worn device by unclamping its holder, move to another location, and pick up a new device on a holder by reengaging clamping.

Figure 15:
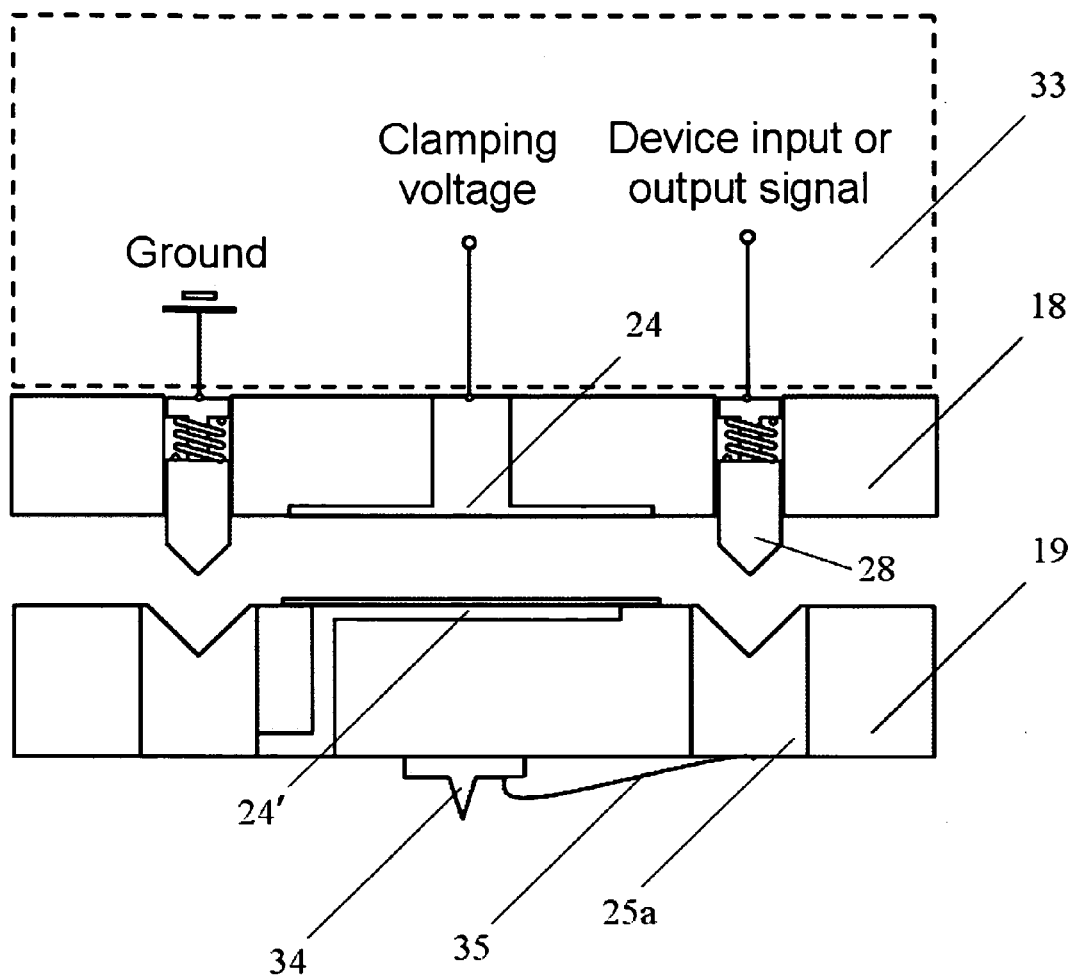

Figures illustrating embodiments of a mounting assembly show a holder above a receiving member by way of example. Orientation of the assembly in space is inessential to its operation and can be chosen to suit a particular application. An exemplary mounting assembly in FIG. 15 comprises a receiving member 18 disposed above a holder 19 which is affixed to a positioner 33. Holder 19 carries a probe 34 that may have one or more electrical terminals. An example terminal is electrically connected by wire 35 to a holder-side electrode 25*a*. When the holder and the receiving member are joined to form an assembly, a signal may be applied to or read from device 34 by connecting to electrode 28 formed in the receiving member, as shown in this figure. Another electrode 28 is used to apply clamping voltage to the assembly, as shown. In this example, clamping electrode 24' on the surface of holder 19 is grounded when the holder is joined to the receiving member. Positioner 33 in this example is a 3-axis positioner disclosed above, but other types of positioners may be used to position the mounting assembly.

It should be noted that a 3-axis positioner with an integrated optical positioning control instrument preferred embodiments of which are shown in FIG. 9 or FIG. 10 in combination with a disclosed mounting assembly make up a tool ideally suited for in-situ replacement of worn or contaminated probes in scanning probe microscopy, and for numerous other applications. Any application requiring compactness, rigidity and precision of positioning, as well as hot-swapping of micro-machined instruments, probes or arrays of probes, micro-manipulators, microdispensers, or other devices—where reproducible return after swapping is necessary, will greatly benefit form this invention. A probing station comprising a positioner with an integrated optical positioning control instrument of the present invention or a plurality thereof, may be used for a variety of tasks, for example, to characterize using a scanning probe sub-microscale devices, nanoassemblies or molecules.

We claim:

1. A positioner comprising:
    a platform and a frame comprising an inertial actuator, said frame having a surface disposed in frictional contact with a surface of said platform and
    wherein said actuator is capable of positioning said platform and
    said frame with respect to each other; and
    wherein a plurality of bearing means is disposed between said frame and said platform and is capable of rolling; and
    wherein said plurality of bearing means serves to exert a loading force on said frictional contact.

2. A positioner of claim 1 wherein said inertial actuator is a piezoelectric actuator.

3. A positioner of claim 1 wherein said inertial actuator is a magnetostrictive actuator.

4. A positioner of claim 1 wherein said plurality of rollers is disposed in a groove or a plurality thereof formed in one or more of
    said platform to said frame to restrict motion of said platform with respect to said frame to a single axis.

5. A positioner of claim 1 wherein the surface of said frame disposed in contact with the said platform is a surface of said actuator.

6. A positioner of claim 1 wherein said rollers are selected from the group consisting of: spherical balls, cylinders.

7. A positioner of claim 1 further comprising a spring member effecting said loading force.

8. A positioner of claim 1 wherein said platform has a surface whereon an object being positioned is disposed, said surface is substantially parallel to the surfaces disposed in said frictional contact.

9. A three-axis positioner comprising a stack of three positioners defined in claim 1.

10. A positioner as defined in claim 1 wherein said frame comprises a base and carrier; said actuator being disposed between said base and carrier and fixedly attached to each to cause relative movement between said base and carrier along an axis when activated; said carrier including elements acting on said bearing means to create said loading force.

11. A positioner of claim 1 wherein said frame further comprises a carrier having a surface rigidly attached to said actuator and wherein said surface of the frame disposed in frictional contact with said platform is a surface of said carrier.

12. A probing station comprising a positioner according to claim 1 carrying a probe capable of characterizing a device, wherein said probe-consisting of: a scanning microscopic probe, an optical probe, a tip of an atomic force microscope, a nano indenter, micro indenter, a micro machined scanning electron microscope, a probe making electrical connection to said device, a capacitive probe.

13. A positioner of claim 11 where said frame includes a base, with said actuator rigidly attached to said base, with said carrier rigidly attached to the actuator, and the surface of frictional contact between said carrier and said platform is substantially planar;

and wherein one or more of: a base, a platform, and a carrier comprises a plurality of containing surfaces;

and wherein a plurality of rollers capable of rolling along a direction of motion effected by said actuator is disposed between said containing surfaces, said plurality providing a loading force on said frictional contact.

14. The positioner of claim 13 having a height measured in the direction normal to said substantially planar surface of frictional contact between 0.1 and 0.75 of the square root of the product of the length and width of said frame.

15. A positioner of claim 13 with one or more of said containing surfaces disposed at an acute angle with respect to said substantially planar surface of frictional contact.

16. A positioner of claim 13 wherein the cross-section of the platform in the plane perpendicular to its direction of motion is substantially trapezoidal.

17. A positioner of claim 13 having the lowest mechanical resonance frequency between 30 kHz and 100 kHz.

18. A positioner of claim 13 having the lowest mechanical resonant frequency between 5 kHz and 30 kHz.

19. A positioner of claim 13 having the maximum achievable velocity between 0.1 mm/sec and 10 mm/sec.

20. A positioner of claim 13 wherein said actuator comprises one or more stack of piezoelectric elements.

21. A positioner of claim 13 wherein said base is the platform of another inertial positioner according to claim 1.

22. A positioner of claim 11 wherein said frame further comprises a base having a top surface, and wherein said carrier has a surface comprising a substantially cylindrical portion, and wherein said actuator comprises a stack of piezo elements;

and wherein surface of said stack is connected to said base and another surface of said stack to said carrier;

and wherein said platform has a surface comprising a substantially cylindrical portion, disposed in frictional contact with the carrier along substantially cylindrical portion of both parts;

and said platform and said carrier comprise a plurality of containing surfaces;

and at least 2 rollers that put a loading force on said frictional contact and are capable of rolling along the direction of motion effected by said actuator are disposed between said containing surfaces.

23. A positioner of claim 22 wherein said platform is inserted into said carrier.

24. A positioner of claim 22 wherein said carrier is inserted into said platform.

25. A positioner of claim 22 wherein said base is the platform of another inertial positioner according to claim 1.

26. A positioner of claim 22 having the height measured in the direction perpendicular to said base between 0.1 and 1.5 of the square root of the product of length and width of said positioner.

27. A positioner of claim 22 with the lowest resonant frequency in the range between 30 kHz and 100 kHz.

28. A positioner of claim 11 where said carrier comprises a part fixedly attached to said actuator to be displaced by said actuator relative to said base; said carrier having a surface which is in frictional contact with the platform to chase low rate movement of the platform and carrier together; a plurality of bearing means between said platform and carrier to produce a loading force on said frictional contact but allow rolling along a direction of motion effected by said actuator.

29. A three-axis inertial positioner comprising:
a first positioner as set forth in claim 1, the three-axis inertial positioner further comprising:
a second actuator affixed to said first platform, a second carrier, and a second platform wherein said actuator is capable of positioning said second platform with respect to said first platform and wherein said second carrier is in frictional contact with said second platform along a substantially planar interface; further comprising:
a third actuator affixed to second platform, a third carrier, and a third platform wherein said third actuator is capable of positioning said third platform with respect to said second platform and wherein said third carrier is in frictional contact with said third platform along a common interface having a substantially cylindrical platform.

30. An inertial multi-axis positioner with a coordinate sensing instrument comprising:
a stack of single-axis inertial positioners having a first positioner comprising a base and a last positioner comprising a movable platform,
said inertial multi-axis positioner further comprising:
a position-sensing photodetector affixed to said platform of the last positioner, and
a fiber interferometer comprising a fiber from which light is emanating and impinging on said photodetector,
wherein an end of said fiber is fixed with respect to the base of said first positioner.

31. An inertial multi-axis positioner of claim 30 wherein said light propagating between said fiber and said photodetector is substantially enclosed within said multi-axis positioner.

* * * * *